US006175393B1

(12) United States Patent
Ban et al.

(10) Patent No.: US 6,175,393 B1
(45) **Date of Patent: *Jan. 16, 2001**

(54) ACTIVE-MATRIX TYPE LIQUID CRYSTAL DISPLAY DEVICE AND METHOD OF COMPENSATING FOR DEFECTIVE PIXEL

(75) Inventors: Atsushi Ban, Soraku-gun; Takayuki Shimada, Yamatokoriyama; Mikio Katayama, Ikoma, all of (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/700,172

(22) Filed: Aug. 20, 1996

(30) Foreign Application Priority Data

Sep. 28, 1995 (JP) .................................................. 7-251339

(51) Int. Cl.[7] ...................... G02F 1/1343; G02F 1/1333; G02F 1/136

(52) U.S. Cl. ................................ 349/39; 349/38; 349/40; 349/41; 349/43; 349/54

(58) Field of Search .................................. 349/38–43, 54

(56) References Cited

U.S. PATENT DOCUMENTS

| | | |
|---|---|---|
| 4,368,523 | 1/1983 | Kawate . |
| 4,688,896 | 8/1987 | Catleberry ........................... 350/333 |
| 5,032,883 | 7/1991 | Wakai et al. ........................ 357/23.7 |

(List continued on next page.)

FOREIGN PATENT DOCUMENTS

| | | |
|---|---|---|
| 61-156025 | 7/1986 | (JP) . |
| 135351 | 7/1989 | (JP) . |
| 04096023 | 3/1992 | (JP) . |
| 4307521 | 10/1992 | (JP) . |
| 474714 | 11/1992 | (JP) . |
| 6230422 | 8/1994 | (JP) . |
| 07064109 | 3/1995 | (JP) . |

OTHER PUBLICATIONS

Fujita et al: "Colorless Polyimide," vol. 29, No. 1 (Jun. 1991), pp. 20–28.

Sakamoto et al: "27.3: A High–Aperture–Ratio 3–in.–Diagonal VGA a–Si Light Valve with Pixel/Data and Pixel/Gate Lines Overlapping,"*SID 96 Digest*, pp. 681–684, 1996.

Kim et al: "4.3: High–Aperture and Failt–Tolerant Pixel Structure for TFT–LCDs," *SID 95 Digest*, pp. 15–18, 1995.

"High–Aperture and Fault–Tolerant Pixel Structure for TFT–LCDs" (S.S. Kim et at, Society for Information Display International Symposium Digest of Technical Papers, May, 1995, pp. 15–18).

(List continued on next page.)

*Primary Examiner*—William L. Sikes
*Assistant Examiner*—Julie Ngo
(74) *Attorney, Agent, or Firm*—Nixon & Vanderhye P.C.

(57) ABSTRACT

Auxiliary lines are formed under pixel electrodes so as to be parallel to signal lines. The auxiliary lines are connected to the signal lines at one point for each pixel. This permits a voltage to be kept applying to a signal line even if a disconnection defect occurs in the signal line by making a circuit around a disconnected portion by the auxiliary line. Moreover, if a leakage defect occurs at a crossing point between the scanning line and the signal line, the signal line would be cut off on both sides of the scanning line. This also permits a voltage to be kept applying to the signal line by the auxiliary line. By setting the auxiliary lines narrower than the signal line, a reduction in aperture ratio can be suppressed, and by adopting the auxiliary lines made of a transparent electrically conductive material such as ITO, etc., it is possible to prevent the reduction in aperture ratio due to the auxiliary lines. The described arrangement permits a generation of a line-shaped defect due to disconnection to be prevented while improving an aperture ratio of the pixel with ease.

10 Claims, 19 Drawing Sheets

11 2 10 4b 5 4 12 4b 10 2 11 9 8 3

U.S. PATENT DOCUMENTS

| | | | | |
|---|---|---|---|---|
| 5,166,085 | | 11/1992 | Wakai et al. | 437/40 |
| 5,475,246 | * | 12/1995 | Wei et al. | 257/291 |
| 5,585,951 | | 12/1996 | Noda et al. | 349/122 |
| 5,641,974 | | 6/1997 | den Boer et al. | 257/59 |
| 5,682,211 | | 10/1997 | Yao et al. | 349/38 |
| 5,696,566 | * | 12/1997 | Kim et al. | 349/39 |
| 5,771,083 | * | 6/1998 | Fujihara et al. | 349/147 |
| 5,822,027 | * | 10/1998 | Shimida et al. | 349/39 |
| 5,847,780 | * | 12/1998 | Kim et al. | 349/39 |
| 5,859,683 | * | 1/1999 | Tagusa et al. | 349/138 |
| 5,877,830 | * | 3/1999 | Shimada et al. | 349/113 |
| 5,877,832 | * | 3/1999 | Shimada | 349/138 |

OTHER PUBLICATIONS

Patent Abstracts of Japan, vol. 016, No. 327 (P–1387), Jul. 16, 1992 & JP 04 096023 A, Mar. 27, 1992.

Patent Abstracts of Japan, vol. 014, No. 072 (P–1004), Feb. 9, 1990 & JP 01 291217 A, Nov. 22, 1989.

Patent Abstracts of Japan, vol. 008, No. 033 (P–254), Feb. 14, 1984 & JP 58 189615 A, Nov. 5, 1983.

* cited by examiner

F I G. 9
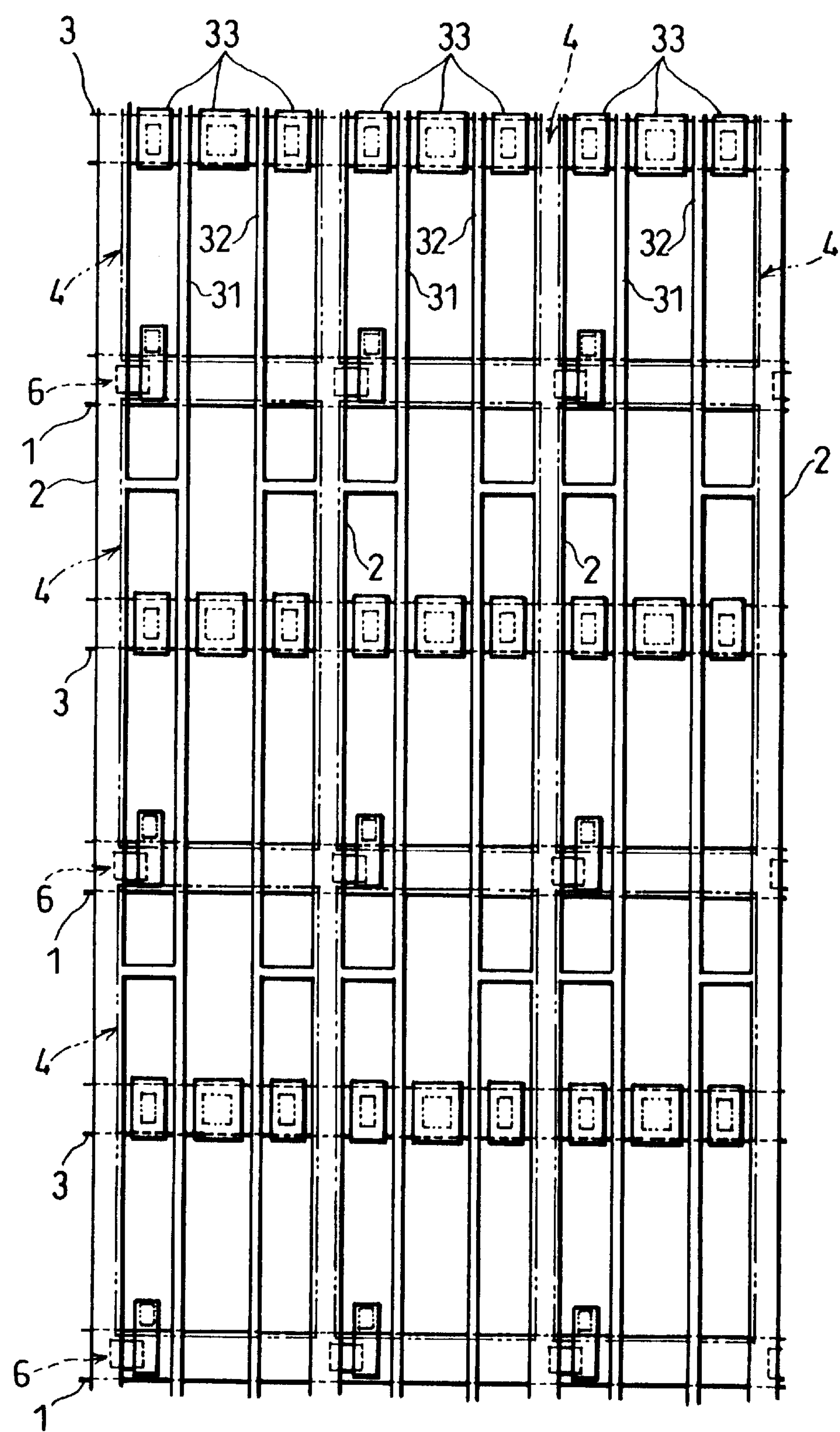

F I G. 13
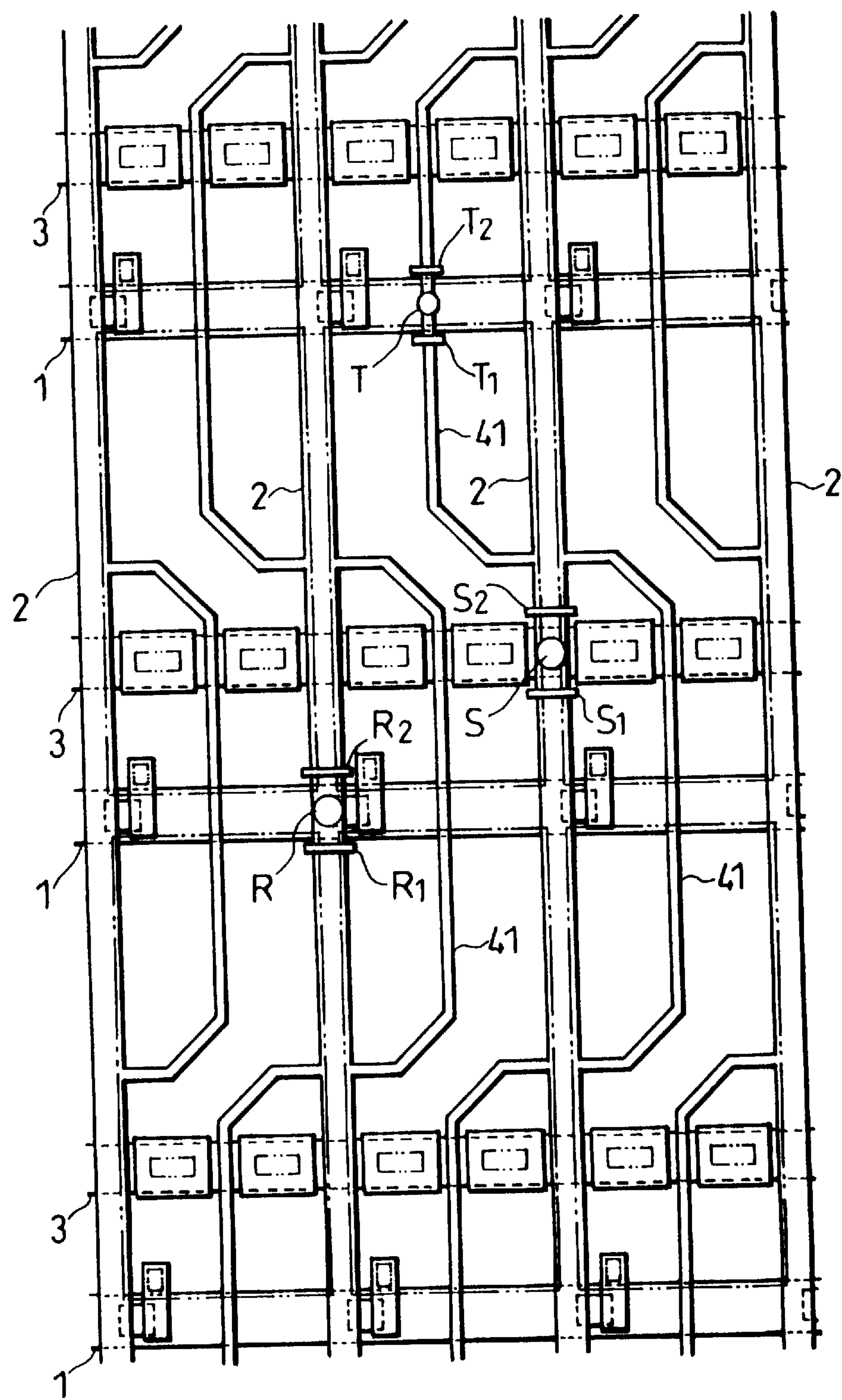

ACTIVE-MATRIX TYPE LIQUID CRYSTAL DISPLAY DEVICE AND METHOD OF COMPENSATING FOR DEFECTIVE PIXEL

RELATED APPLICATIONS

This application is related to the following commonly assigned co-pending applications: Ser. No. 08/695,632, filed Aug. 12, 1996; Ser. No. 08/712,978, now U.S. Pat. No. 5,877,830 filed Sep. 12, 1996; Ser. No. 08/697,277, filed Aug. 27, 1996; Ser. No. 08/705,759, filed Aug. 30, 1996 now U.S. Pat. No. 5,831,708; and Ser. No. 08/725,663, filed Oct. 1, 1996 now U.S. Pat. No. 5,771,083.

FIELD OF THE INVENTION

The present invention relates to a display device for displaying by applying a drive signal to a display-use pixel electrode through a switching element, more particularly relates to a matrix-type liquid crystal display device, which permits a high density display by disposing pixel electrodes in a matrix form, and also relates to a method of compensating for a defective pixel electrode in such display device.

BACKGROUND OF THE INVENTION

A conventional display device such as a liquid crystal display device, a plasma display device, etc., includes a plurality of pixel electrodes disposed in a matrix form, counter electrodes facing these pixel electrodes, and a display medium (liquid crystal, plasma, etc., ) sealed between the pixel electrodes and the counter electrodes. The described display device selectively applies a voltage to the pixel electrodes to form a display pattern on a screen. Further, by applying a voltage between the selected pixel electrode and the counter electrode, the brightness of the display medium is optically modulated by the display data to visualize the display pattern.

For the method of driving the pixel electrodes, a so-called active-matrix driving system is known wherein switching elements are connected to respective pixel electrodes disposed in a matrix form and the pixel electrodes are respectively driven by the switching elements. For the switching element, a TFT (thin-film transistor), and an MIM (metal-insulator-metal) element, etc., are generally known. On the other hand, the pixel electrodes are typically formed on the substrate in the same layer as signal lines, scanning lines (bus lines) in such a manner that they do not contact the signal lines or the scanning lines.

Additionally, the technique of forming pixel electrodes on a different layer from the bus lines by disposing the pixel electrodes on an insulting film is proposed (Japanese Laid-Open Patent Application No. 156025/1986 (Tokukaisho 61-156025). In the described arrangement, as the pixel electrodes and the bus lines are formed on different layers, an increased area of the pixel electrodes (aperture ratio) can be achieved.

The liquid crystal display device adopting the matrix-type substrate always faces a problem of a disconnection of wire due to a defect generated in the manufacturing process. In order to suppress the generation of such disconnection defect, the active-matrix type liquid crystal display device which adopts double bus lines has been proposed (SID '95 DIGEST of TECHNICAL PAPERS 4: AMLCDs 4.3; "High-Aperture and Fault-Tolerant Pixel Structure for TFT-LCDs").

As shown in FIG. 14, the described active-matrix type liquid crystal display device is arranged such that two scanning lines 52 and 52' are formed for each pixel electrode 51, and the scanning lines 52 and 52' are short-circuited by short-circuit lines 54 formed along signal lines 53 on both sides of the pixel electrode 51. The short-circuit lines 54 are superimposed on the pixel electrode 51 via an insulating film (not shown), and an overlapped portion functions as an auxiliary capacitance. In the described arrangement, as a TFT 55 is driven by the two scanning lines 52 and 52', even if a disconnection occurred in one of the scanning lines 52 and 52', an application of the gate voltage to the TFT 55 can be ensured through the short-circuit lines 54.

In general, in order to prevent light from leaking through a gap formed between the pixels, a light-shielding pattern is formed on the side of the counter electrodes. In the described arrangement, however, the pixel electrode 51 and the short-circuit lines 54 are superimposed in a direction perpendicular to the substrate. Therefore, the short-circuit lines 54 form a part of the light-shielding pattern.

The arrangement where the pixel electrode and the signal line are superimposed via the insulating film will be explained.

In the arrangement shown in FIG. 15, peripheral portions on both sides of the pixel electrodes 51 are superimposed on the scanning lines 52 and the signal lines 53. As shown also in FIG. 16, at a central portion below the pixel electrode 51, formed is an auxiliary capacitance electrode (hereinafter referred to as Cs electrode) 56. The Cs electrode 56 is formed on a gate insulating film 57 used in common with the TFT 55 (see FIG. 15). The Cs electrode 56 is in contact with a contact portion 51a of the pixel electrode 51.

On a substrate 58 made of glass, formed is an auxiliary capacitance line 59. The gate insulating film 57 is formed so as to cover the auxiliary capacitance line 59. On both sides of the Cs electrode 56 on the gate insulating substrate 57, lower signal lines 60 are formed, and further, signal lines 53 are formed thereon. The lower signal lines 60 and the signal lines 53 are covered with an insulating substrate 61.

In the described arrangement, as the insulating film 61 is formed between the pixel electrode 51 and the signal lines 53, an increased area of the pixel electrode 51 can be obtained irrespectively of the disposed positions of the signal lines 53.

The arrangement shown in FIG. 17 includes the Cs electrode 56 having the same structure as that of the aforementioned arrangement of FIG. 15, except that the Cs electrode 56 is connected to a drain electrode 62 through a connection line 63. The arrangements shown in FIG. 15 and FIG. 17 both have the Cs-on-Common structure wherein an auxiliary line capacitance is formed by disposing the Cs electrode 56 on the common auxiliary capacitance line 59 which is used in common among all the pixels.

On the other hand, the arrangement shown in FIG. 18 has the Cs-on-Gate structure wherein an auxiliary capacitance is formed by disposing the Cs electrode 56 on the scanning line 52 of an adjacent pixel. In this arrangement, the Cs electrode 56 is connected to a contact portion 51*b* of the pixel electrode 51.

In the arrangement shown in FIG. 19, the Cs electrode 56 is connected to the drain electrode 62 through the connection line 63.

With a demand for higher definition and higher aperture ratio, there is a tendency of reducing the width of the bus line while increasing the number of the bus-line crossing parts, which increases a disconnection of a bus-line or a leakage at a portion where the bus-lines are crossed. Furthermore, such disconnection of bus-line, or the leakage at the crossing point causes a problem that a voltage cannot be applied properly to the pixel electrode connected to the disconnected bus line. Therefore, the portion where the voltage is not applied appears as a line-shaped defect on the display screen. In the display element, such line-shaped defect is a serious problem, and a display device having such line-shaped defect is considered as an inferior good. Further, an increase in such inferior goods would lower the yield of the display device, thereby increasing a manufacturing cost.

Furthermore, when the described arrangement of adopting the double bus line is applied to the general arrangement where the pixel electrode and the bus line are formed in the same layer, as the pixel electrode is formed in the same layer as the bus line, an increased area of the pixel electrode cannot be obtained, thereby hindering an improvement of the aperture ratio. Although a small improvement in aperture ratio can be achieved by reducing an interval between the wires; this would causes the problem that a leakage between the wires is likely to occur.

In the arrangements shown in FIG. 15 through FIG. 19, it is permitted to arrange such that the pixel electrode 51 and the data electrodes 53 are superimposed. However, the capacitance between the pixel electrode 51 and the signal line 53 cannot be made smaller due to the insulating film 61 formed therebetween. Therefore, the problem of generating crosstalk due to the capacitance, which would lower the display quality remains unsolved.

SUMMARY OF THE INVENTION

An object of the present invention is to provide an active-matrix type liquid crystal display device whose structure permits a generation of a line-shaped defect to be prevented and an improved aperture ratio to be attained with ease.

In order to fulfill the above object, an active-matrix type liquid crystal display device in accordance with the present invention which includes a plurality of scanning lines formed on a substrate; a plurality of signal lines formed so as to cross the scanning lines at right angle; a pixel electrode formed in a region surrounded by adjacent scanning lines and adjacent signal lines; and a switching element for switching ON/OFF an application of a signal voltage to the pixel electrode through the signal line by a scanning voltage to be applied to the scanning line is characterized by further including the following means.

Namely, the first active-matrix type liquid crystal display device includes auxiliary lines formed in the same layer as the signal lines. Each auxiliary line short-circuits two portions of the signal line for applying a signal voltage to corresponding two pixel electrodes which are adjacent to one another along the signal lines.

The second active-matrix type liquid crystal display device is arranged so as to include auxiliary lines formed in the same layer as the scanning lines. Each auxiliary line short-circuits two portions of the scanning line for applying a scanning voltage to corresponding two pixel electrodes which are adjacent to one another along the scanning line.

According to the first active matrix-type liquid crystal display device, two portions of the signal line are short-circuited by the auxiliary line. Therefore, when a disconnection defect occurred in the signal line, a signal voltage would be applied to the signal line through the auxiliary line so as to make a circuit around to avoid the disconnected portion. This feature offers a particular effect that even if a disconnection defect occurred between a certain pixel electrode and a next pixel electrode, the signal voltage can be kept applying to the pixel electrode.

Similarly, in the second active-matrix type liquid crystal display device, when a disconnection defect occurred in the scanning line, a scanning voltage is applied to the scanning line so as to make a circuit around to avoid the disconnected portion. Therefore, the scanning voltage can be kept applying to the pixel electrode.

As a result, a generation of a line-shaped defect is prevented, and good products can be obtained at significantly improved yield. Here, the following problem possibly occurs: That is, a signal line which starts being disconnected is finally disconnected after the active-matrix type liquid crystal display device is delivered to the user. The described active-matrix type liquid crystal displays of the present invention provide the solution to the described problems and permits a display quality to be ensured even in the described situation. Therefore, an active-matrix type liquid crystal display device permits a reduction in manufacturing cost while improving a reliability.

As a preferred form of the first or second active matrix-type liquid crystal display device, it may be arranged such that each auxiliary line is connected to a single signal line or a single scanning line at one portion at a predetermined interval from the crossing point between the signal line and the scanning line per each pixel region.

The conventional arrangement where the auxiliary line is connected to the signal line or the scanning line at a plurality of portions formed at different intervals from the crossing point between the signal line and the scanning line per pixel region has such a drawback that the signal line or the scanning line between the connecting portions will not be short-circuited to the signal line or the scanning line corresponding to the adjacent pixel electrode. In contrast, the described arrangement of the present invention eliminates the described problem, i.e., the defective portion where the signal line or the scanning line is not short-circuited by the auxiliary lines by specifying the connecting portion between the auxiliary line and the signal line or the scanning line.

The auxiliary line of the present invention is arranged so as to have a minimum length required for applying a signal voltage or the scanning voltage in replace of the signal line or the scanning line at an occurrence of disconnection defect. Therefore, even if a material of a large specific resistance, such as ITO, etc., is adopted for the auxiliary line, an overall increase in resistance of the wires can be suppressed, thereby preventing the deterioration of the display characteristics. Therefore, the active-matrix type liquid crystal display device can be achieved with an improved yield at low cost with high reliability.

As another preferred form of the first or the second active-matrix type liquid crystal display device, it may be arranged such that each auxiliary line is formed in a width narrower than that of the signal line or the scanning line to be connected thereto.

The feature that the auxiliary line is formed narrower than the signal line or the scanning line offers an effect that the region where light is blocked by the auxiliary lines in the pixel can be reduced, thereby suppressing a drop in aperture ratio of the pixel. Moreover, an increase in parasitic capacitance between the signal line or the scanning line and the pixel electrode can be suppressed.

As a still another preferred form, the first or second active-matrix type liquid crystal display device may be arranged such that each auxiliary lines are made of a transparent electrically conductive material.

This feature offers an effect that the light that is transmitted through the pixel will not be blocked by the auxiliary lines, thereby preventing a drop in aperture ratio of the pixel. As a result, the active-matrix type liquid crystal display having the described arrangement offers an improved display quality.

As a still another preferred form of the first or second active-matrix type liquid crystal display device, it may be arranged such that the pixel electrodes is formed on an organic insulating film which covers the signal electrode.

In general, as an organic insulating film has a low dielectric constant, a capacitance between the pixel electrode and the signal line can be reduced. Also, the capacitance between the scanning line formed under the signal line and the pixel electrode can be reduced. Therefore, a generation of crosstalk due to the capacitance formed between the pixel electrode and the signal line can be suppressed, and also the pixel voltage that is pulled-in due to the capacitance formed between the scanning line and the pixel electrode can be suppressed. Therefore, the active-matrix type liquid crystal device permits an improved display quality by suppressing the effect from each of the described capacitances.

As a still another preferred form of the first or second active-matrix type liquid crystal display device, it may be arranged such that an insulating film is formed between the pixel electrodes and the signal lines or the scanning lines. On the other hand, two auxiliary lines are respectively connected to two adjacent signal lines or two adjacent scanning lines which are disposed so as to surround the pixel electrode. According to the described arrangement, capacitances are respectively formed between the pixel electrode and one auxiliary line and between the pixel electrode and the other auxiliary line, and the auxiliary lines are formed in such a manner that the described two capacitances are equal. Further, a signal voltage whose polarity reverses per every line is applied to the signal line.

For example, the auxiliary lines are disposed in such a manner that portions connected to one signal line or scanning line are alternately formed between both sides of the signal line or the scanning line. In other words, the auxiliary lines are disposed in such a manner that a plurality of the auxiliary lines are connected to one signal line or scanning line on its opposite sides every one auxiliary line.

In the arrangement where the signal lines are formed in the described pattern, and a signal voltage whose polarity reverses per line is applied to the signal lines, influences from respective capacitances between the pixel electrode and the auxiliary lines can be cancelled out, thereby reducing an influence of the capacitance. As a result, the active-matrix type liquid crystal display having the described arrangement permits a display quality to be improved by reducing a generation of crosstalk due to the capacitance.

The first method of compensating for a defective pixel in accordance with the present invention for the first active-matrix type liquid crystal display device is characterized in that the signal line is cut off on both sides of the scanning line when a leakage defect occurred at a crossing point between the scanning line and the signal line.

According to the described method, when a leakage defect occurred in the crossing point between the scanning line and the signal line, the signal line is disconnected on both sides of the scanning line. After the signal line is disconnected, a voltage is not applied to the signal line at the connecting portion, thereby preventing a generation of leakage. Moreover, even after the signal line is disconnected, as a voltage can be kept applying to the signal line by the auxiliary lines, a generation of a defective pixel can be prevented. As a result, the method of compensating for a defective pixel electrode permits an improved signal quality by eliminating the leakage defect.

The second method of compensating for a defective pixel designed for the second active-matrix type liquid crystal display device is characterized in that the scanning line is cut of f on both sides of the signal line when a leakage defect occurred at a crossing point between the signal line and the scanning line.

The described method offers the same effect as achieved by the first method of compensating for a defective pixel electrode. That is, by cutting off the scanning line, a voltage is not applied to the connecting portion of the scanning line, thereby preventing a generation of leakage. Moreover, even after the signal line is disconnected, as a voltage can be kept applying to the scanning line by the auxiliary lines, a generation of a defective pixel can be prevented. As a result, the method of compensating for a defective pixel electrode permits an improved signal quality by eliminating the leakage defect.

The novel features which are considered as characteristic of the invention are set forth in particular in the appended claims. The improved treatment method, as well as the construction and mode of operation of the improved treatment apparatus, will, however, be best understood upon perusal of the following detailed description of certain specific embodiments when read in conjunction with the accompanying drawings.

BRIEF DESCRIPTION OF THE DRAWINGS

FIG. 9 is a plan view showing an arrangement of one pixel region of a wiring substrate for use in an active-matrix type liquid crystal display device in accordance with the third embodiment of the present invention.

FIG. 13 is a plan view which explains a compensation for a leakage defect generated in the wiring substrate of FIG. 11.

DETAILED DESCRIPTION OF THE PREFERRED EMBODIMENTS

First Embodiment

The following descriptions will discuss one embodiment of the present invention in reference to FIG. 1 through FIG. 6.

Figure 1:
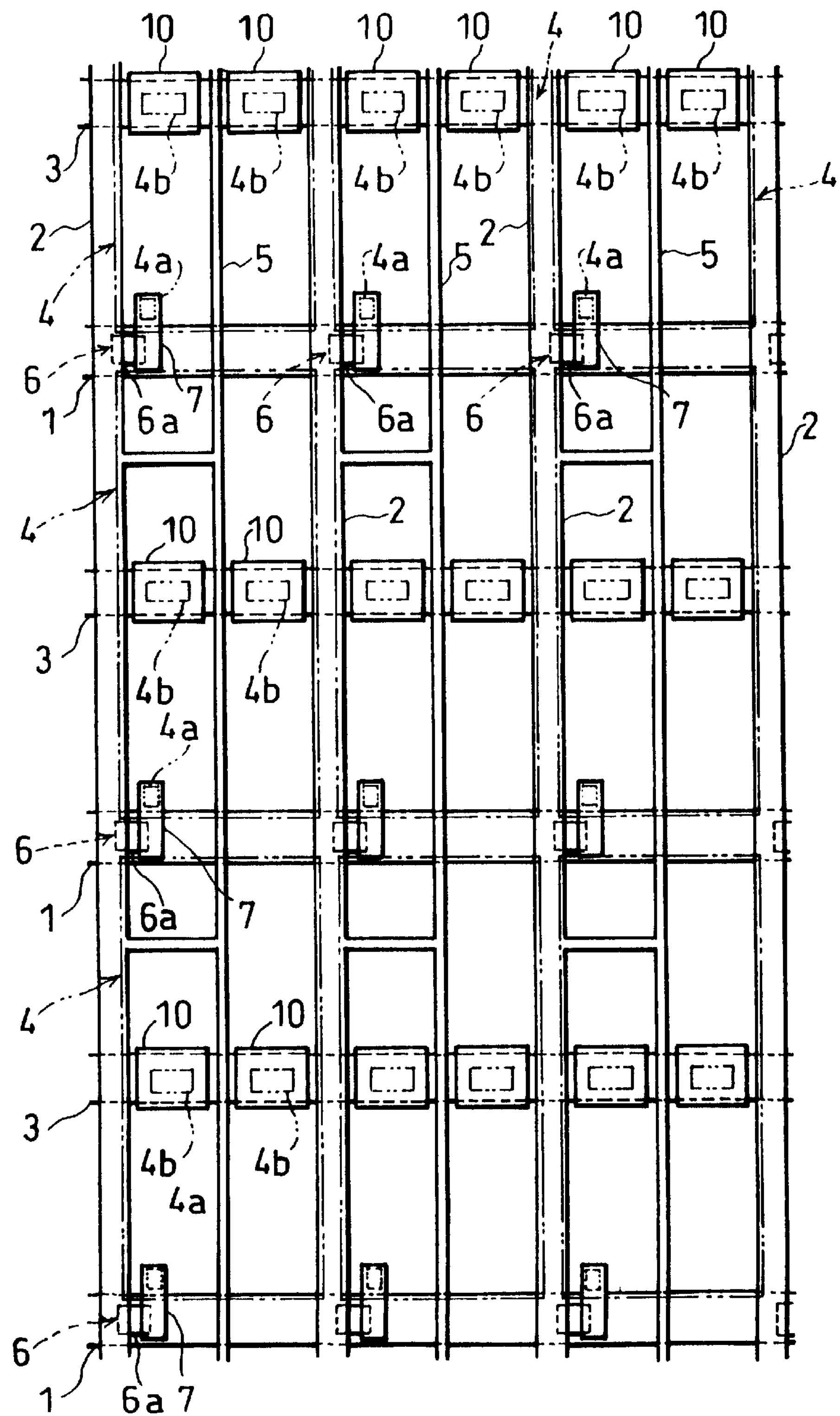
FIG. 1 is a plan view showing a structure of a wiring substrate for use in an active-matrix type liquid crystal display device in accordance with the first embodiment of the present invention.

As shown in FIG. 1, an active-matrix type liquid crystal display device in accordance with the present embodiment (hereinafter referred to as a liquid crystal display device) is provided with a wiring substrate which includes a plurality of scanning lines 1, a plurality of signal lines 2, a plurality of auxiliary capacitance lines 3 (hereinafter referred to as Cs lines), etc. The liquid crystal display device is provided with a liquid crystal panel including the described wiring substrate. The liquid crystal panel is arranged such that the wiring substrate and a counter substrate whereon a common electrode (not shown) is disposed are connected together with a predetermined interval between them. In the space formed between the substrates, a liquid crystal is sealed.

The scanning lines 1 formed in parallel at predetermined intervals, the signal lines 2 formed in parallel at predetermined intervals and the Cs lines 3 formed in parallel at predetermined intervals are disposed on a substrate 8 (see FIG. 3) to be described later. The signal lines 2 which serve as signal lines are formed so as to cross the scanning lines 1 which serve as scanning lines at right angle. The Cs lines 3 are used in common among all the pixels, and are formed parallel to the scanning lines 1. In a region surrounded by the adjacent scanning lines 1 and the adjacent signal lines 2, provided is a pixel electrode 4.

Under the pixel electrode 4, formed are auxiliary lines 5. The auxiliary lines 5 are formed at a central portion of the pixel electrode 4 so as to be parallel to the signal lines 2. Each auxiliary line 5 forms a pair with corresponding signal line 2 for each pixel electrode 4. The auxiliary line 5 is made of a metallic material of the same kind as that of the signal line 2 with a smaller width than that of the signal line 2. Here, the auxiliary line 5 may be made of an electrically conductive film such as indium tin oxide (ITO).

In a vicinity of a crossing point between the scanning line 1 and the signal line 2, provided is a TFT 6 which serves as a switching element. The TFT 6 includes a semiconductor layer 6*a*. The semiconductor layer 6*a* is formed on the scanning line 1 via a gate insulating film 9 (FIG. 3), to be described later. The ends of the semiconductor layer 6*a* are respectively connected to the signal line 2 and a drain electrode 7. Further, an intermediate portion of the semiconductor layer 6*a* is formed as a channel region. The drain electrode 7 is pulled under the pixel electrode 4 so as to be connected therewith. Such connection is made by a contact portion 4a of the pixel electrode 4.

By applying an ON-voltage (scanning voltage) to the scanning line 1, the TFT 6 is switched ON, and further, a voltage that is to be applied to the signal lines 2 is applied to the pixel electrode 4 so as to charge the pixel capacitance.

Figure 2:
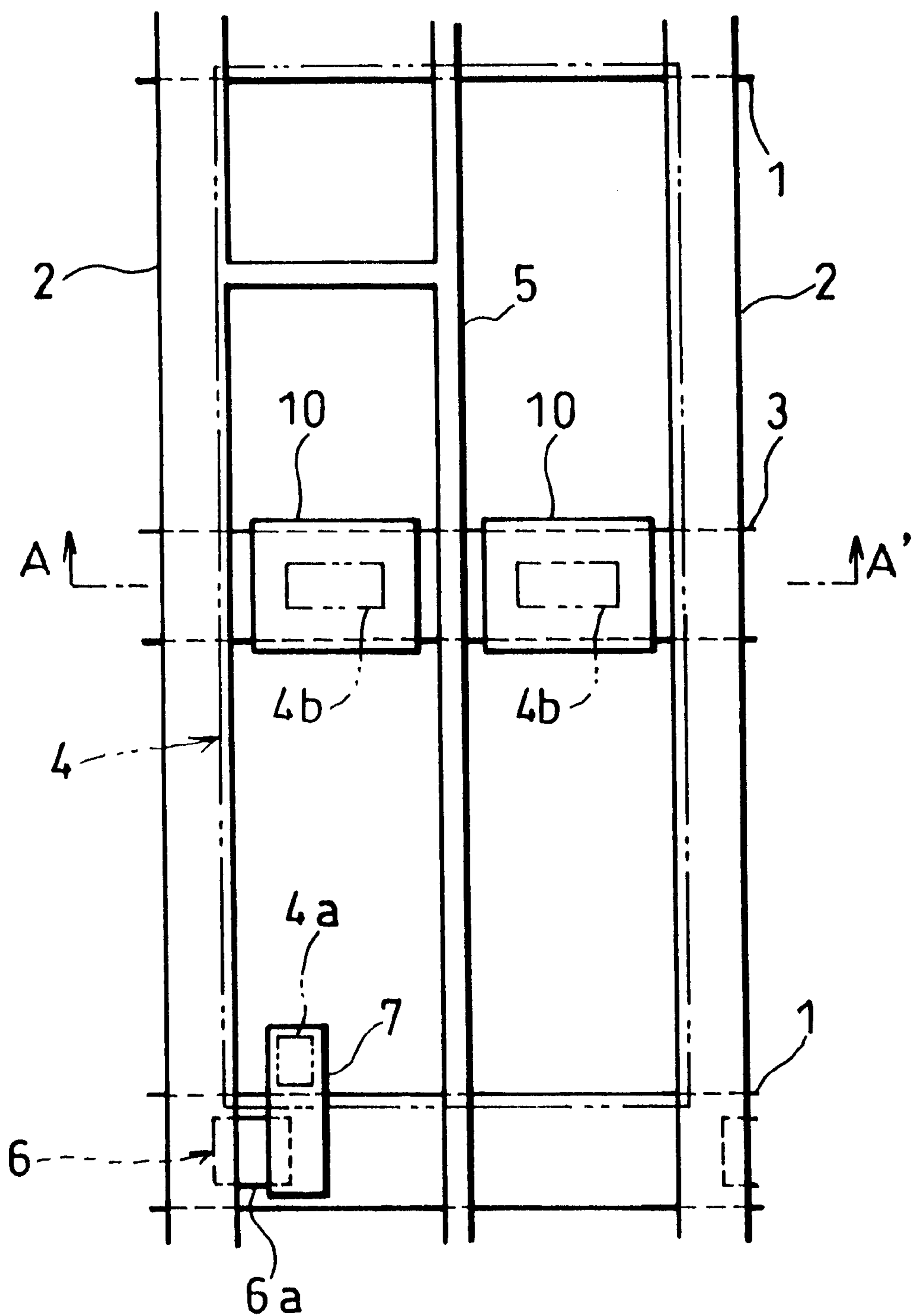
FIG. 2 is a plan view which shows an enlarged view of the arrangement of one pixel region in the wiring substrate of FIG. 1.
Figure 3:
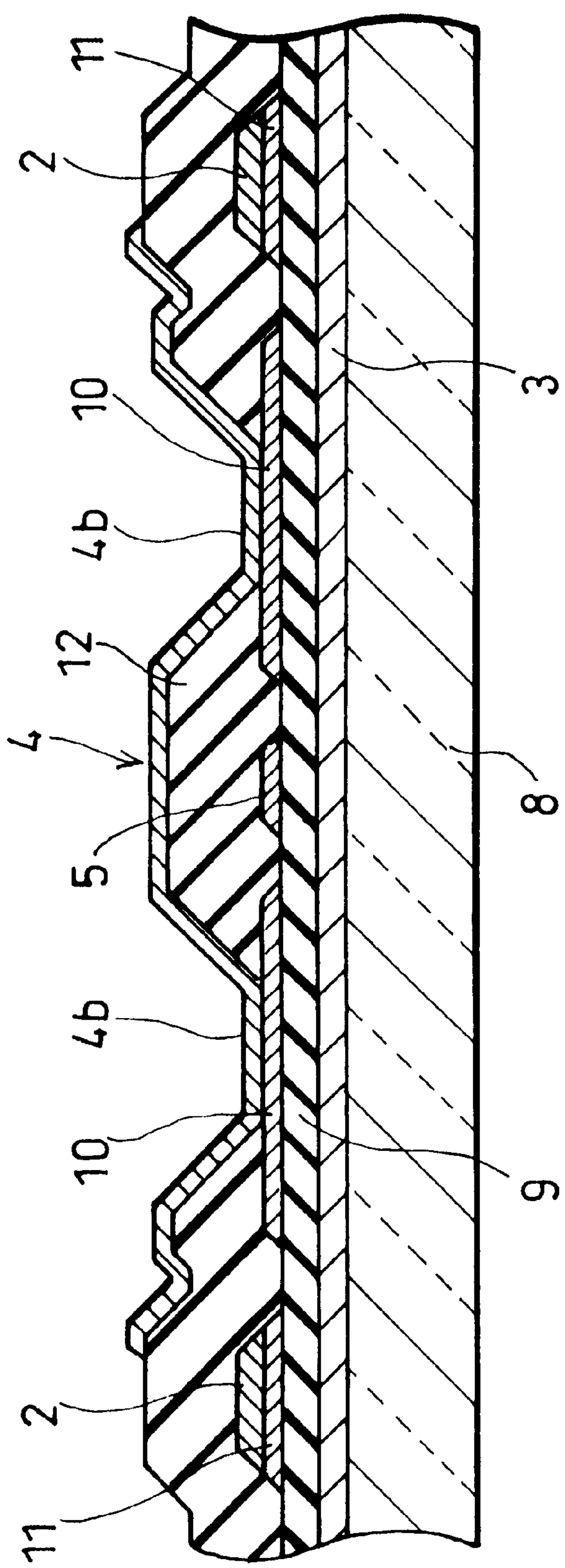
FIG. 3 is a cross-sectional view of the wiring substrate of FIG. 2 taken along lines A–A'.
Figure 4:
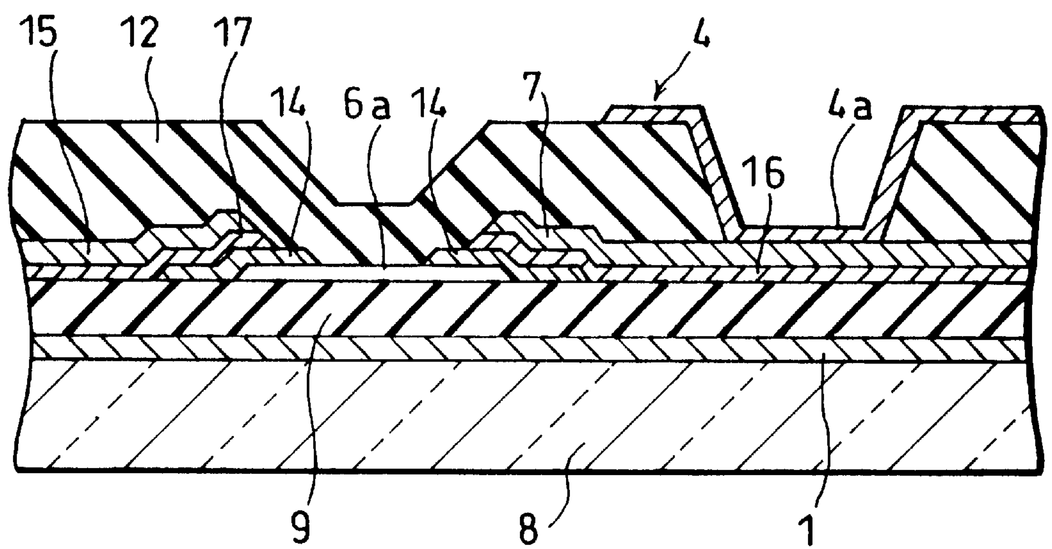
FIG. 4 is a cross-sectional view showing the arrangement of a portion of a TFT in the wiring substrate of FIG. 2.

The Cs lines 3 are formed in such a manner that each Cs line 3 is disposed between adjacent two scanning lines 1. As shown in FIG. 2 and FIG. 3, the Cs line 3 is formed on the substrate 8 made of an insulating and transparent material such as glass, etc. As shown in FIG. 3 and FIG. 4, the scanning line 1 is formed in the same layer as the Cs line 3.

As shown in FIG. 3, on the Cs line 3, two auxiliary capacitance electrodes 10 (hereinafter referred to as Cs electrodes) are formed for each pixel via the gate insulating film 9. On the gate insulating film 9, auxiliary lines 5 are formed between the Cs electrodes 10, and lower layer signal lines 11 are formed on both sides of the Cs electrodes 10. On the lower layer signal lines 11, the signal lines 2 are formed.

Further, the described layers are covered with an insulating film 12 whereon a pixel electrode 4 is formed. The pixel electrode 4 has concave contact portions 4*b* respectively in contact with the Cs electrodes 10. The insulating film 12 is made of an organic material of a low dielectric constant represented by resin.

The Cs electrodes 10 are formed on the Cs lines 3 which are used in common among all the pixels. The auxiliary capacitance has the Cs on Common structure composed of the Cs line 3, the Cs electrodes 10 and the gate insulating film 9 sandwiched therebetween.

It should be noted here that the present embodiment is not limited to the described arrangement, and other arrangements, for example, below-explained arrangements may be adopted.

Figure 5:
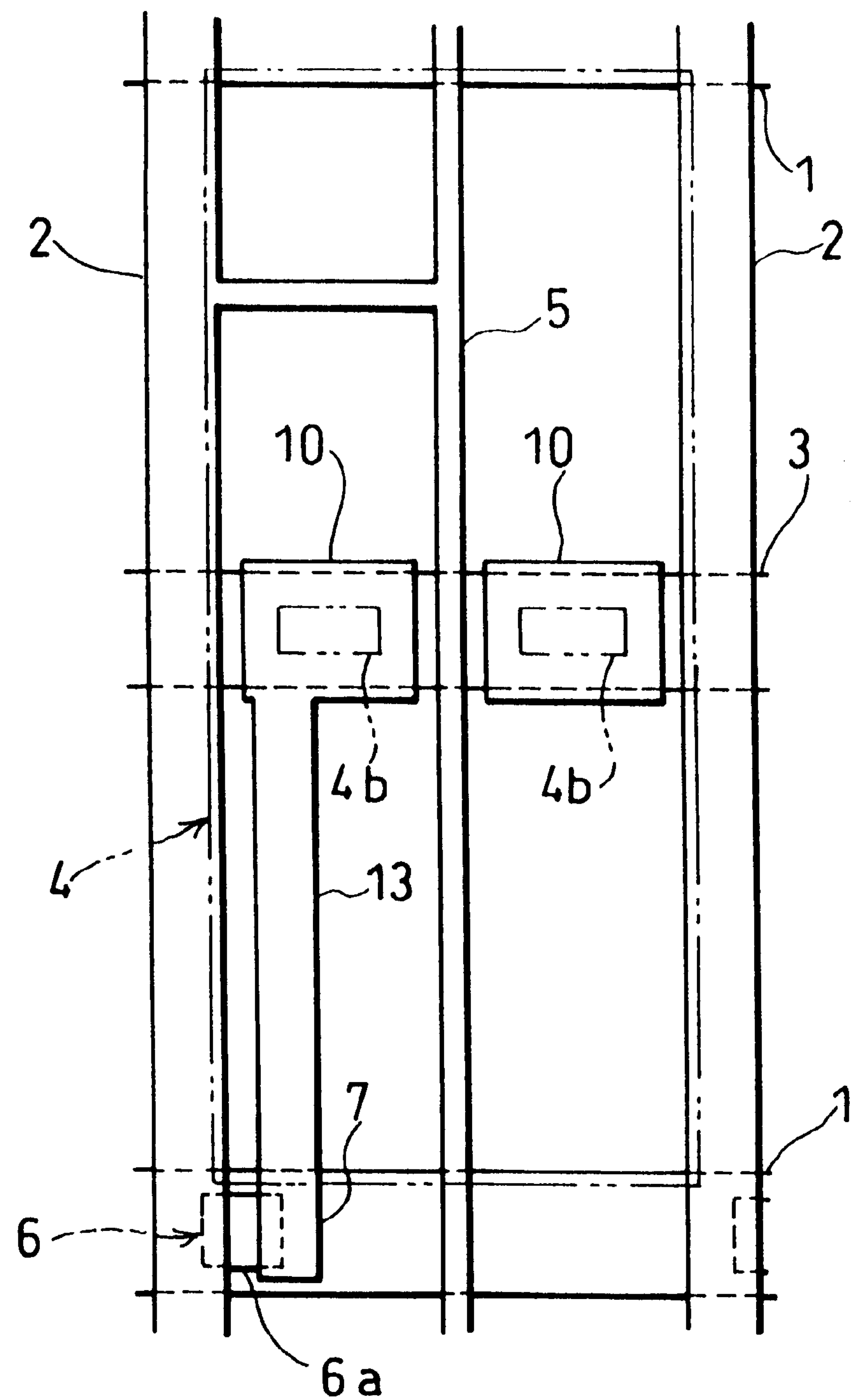
FIG. 5 is a plan view showing another arrangement where an auxiliary line is connected to the signal line in the wiring substrate in accordance with the first embodiment of the present invention.

In the arrangement shown in FIG. 5, one of the Cs electrodes 10 is connected to the drain electrode 7 through the connection line 13. This arrangement has the Cs on Common structure as in the arrangement of FIG. 2, but is different from the arrangement of FIG. 2 in that the drain electrode 7 is connected to the picture electrode 4 via the Cs electrode 10.

Figure 6:
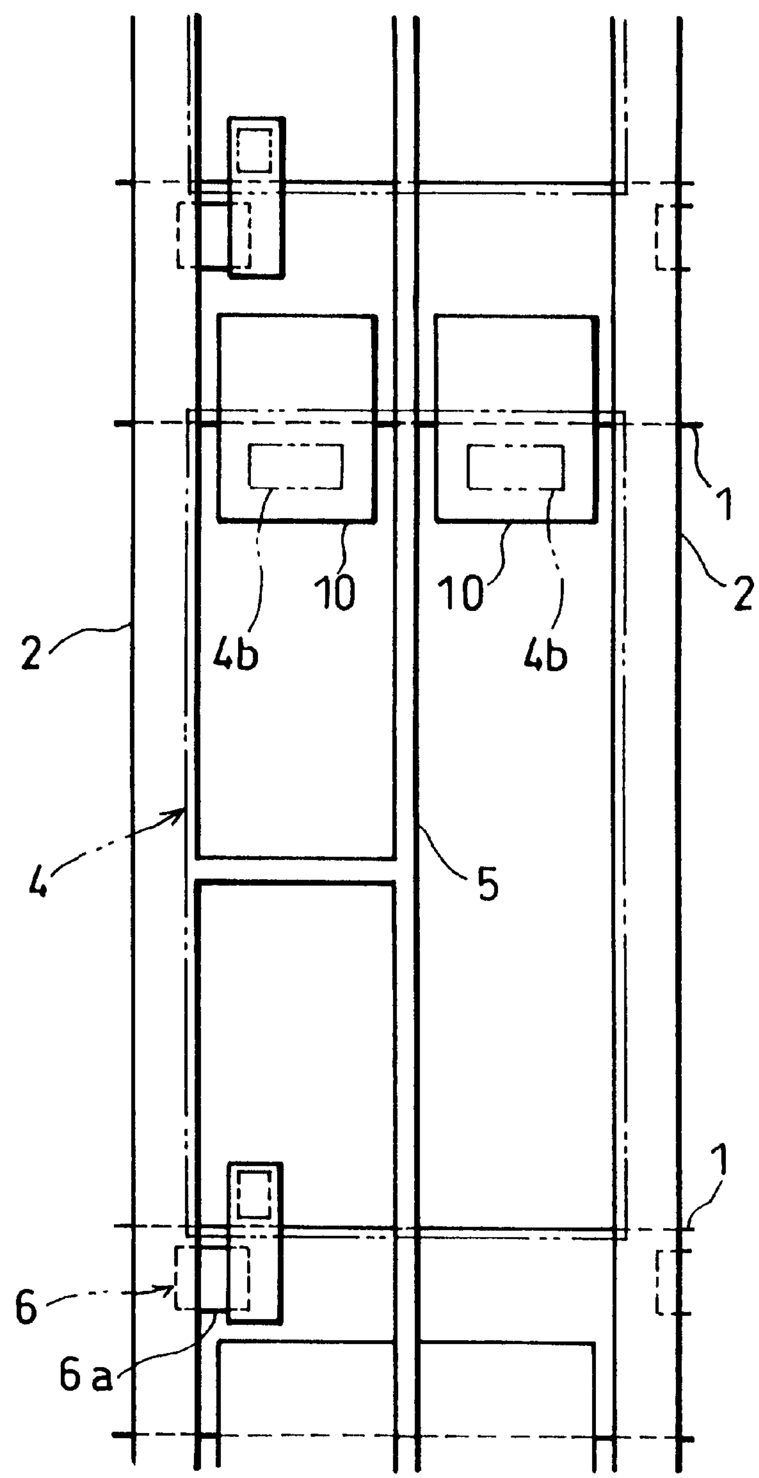
FIG. 6 is a plan view showing a still another arrangement where an auxiliary line is connected to the signal line in the wiring substrate in accordance with the first embodiment of the present invention.

On the other hand, in the arrangement shown in FIG. 6, a part of the Cs electrodes 10 is formed on the scanning line 1 for the adjacent pixel electrode 4. This arrangement has the Cs on gate structure wherein an auxiliary capacitance is formed by the scanning line 1, the Cs electrode 10 and the described gate insulating film 9 (see FIG. 3) sandwiched therebetween.

The manufacturing process of the wiring substrate having the described arrangement will be explained in reference to FIG. 3 and FIG. 4.

First, an electrically conductive thin film is formed on the insulating and transparent substrate 8, and the scanning line 1 and the Cs line 3 are formed by performing a patterning of the electrically conductive thin film. In this embodiment, a glass substrate is used for the substrate 8; however, a material for use in the substrate 8 is not limited to glass, and any materials having an insulating property and a property that light is transmissible therethrough may be used. For the electrically conductive thin film, a Ta series metallic material may be used; however, the material for the electrically conductive thin film is not limited to the Ta series metallic material, and other electrically conductive materials may be used.

Next, an insulating thin film (gate insulating film 9), a semiconductor thin film (semiconductor layer 6*a*) and a semiconductor-electrode contact material thin film are formed in this order so as to cover the scanning lines 1 and the Cs lines 3 to form semiconductor contact layers 14.

Here, silicon nitride is used as the insulating thin film, amorphous silicon is used as the semiconductor thin film, and $n^+$ amorphous silicon is used as a contact material thin film. It should be noted here that the insulating thin film may be formed using other insulating materials than the silicon nitride.

Thereafter, the transparent electrically conductive thin film and the electrically conductive thin film are formed so as to be superimposed, and a patterning of an electrically conductive thin film is performed, thereby forming the signal line 2, the drain electrode 7 and the source electrode 15. Subsequently, by performing a patterning of the transparent electrically conductive thin film, the lower layer signal line 11, the lower layer drain electrode 16, the lower layer source electrode 17, the auxiliary lines 5, and the Cs electrode 10 are formed. Namely, the TFT 6 is formed by the described patterning. As to the TFT 6, as long as it serves as a switching element, the material, the structure and the manufacturing method thereof are not particularly limited d.

Here, ITO is used as the transparent electrically conductive thin film, and the Ta series metallic material is used as the electrically conductive thin film. However, other electrically conductive materials may be used. Additionally, it is permitted to form the signal lines 2, the auxiliary lines 5, the drain electrodes 7 and the Cs electrodes 10 by a metallic material of one kind, or by a transparent electrically conductive material such as ITO. In this case, the need of the lower signal lines 11 is eliminated.

No matter which materials are used respectively for the transparent electrically conductive thin film and the electrically conductive thin film, the auxiliary lines 5 are formed together with the signal lines 2, the Cs electrodes 10, etc., which are needed in manufacturing the wiring substrate. Therefore, the number of processes does not increase by providing the auxiliary lines 5 compared with the conventional manufacturing method of the display element in that an increase in the number of processes required for forming the auxiliary lines 5 can be prevented.

The width of the signal line 2 is set to around 8 $\mu$m in consideration of electric driving conditions. The width of the auxiliary line 5 is set to around 4$\mu$m in consideration of a processing precision of the ITO.

Further, the insulating layer which serves as the insulating film 12 is formed, and a contact hall (see FIG. 4) for connecting the pixel electrode 4 and the drain electrode 7 and another contact hall (see FIG. 3) for connecting the pixel electrode 4 and the Cs electrode 10 are formed thereon. Here, the insulating layer is made of a photoconductive acrylic resin with a thickness of around 3.0 $\mu$m. The dielectric constant of the acrylic resin is set to 3.5. Here, for the insulating layer, organic materials other than the acrylic resin may be used as long as the materials show the insulating property.

Then, by forming and subsequently patterning the ITO, the pixel electrode 4 is formed. Here, the contact portions 4*a* and 4*b* are formed in the contact hall. For the pixel electrode 4, other electrically conductive materials than ITO may be used.

The wiring substrate having the structure shown in FIG. 3 and FIG. 4 are formed in the described manner.

The matrix display element in accordance with the present embodiment having the described arrangement offers the following advantageous characteristics:

(1) Even when a disconnection of the signal line 2 occurs, an application of a voltage to the pixel electrode 4 can be ensured by the auxiliary lines 5, thereby preventing a generation of a line-shaped defect due to the disconnection;

(2) When a leakage occurs in a portion where the scanning line 1 and the signal line 2 are crossed, or a portion where the scanning line 1 and the auxiliary line 5 are crossed, the signal line 2 or the auxiliary line 5 is cut off on both sides of the crossing point by projecting thereto a laser beam, etc. As a result, a voltage will not be applied to the signal line 2 or the auxiliary line 5 at the defective crossing point, thereby eliminating a generation of leakage;

(3) By arranging the auxiliary line 5 so as to have a narrower width than that of the signal line 2, a reduction in the aperture ratio of the pixel can be suppressed. Moreover, by forming the auxiliary line 5 by the transparent electrically conductive material such as ITO, the light transmitted through the pixel will not be blocked by the auxiliary lines 5, thereby preventing a reduction in the aperture ratio of the pixel; and (4) By adopting resin for the insulating film 12, the capacitance (parasitic capacitance) between the signal lines 2 and the pixel electrode 4, and the capacitance between the auxiliary line 5 and the pixel electrode 4 can be made smaller. Here, the smaller is the dielectric constant of the resin and the thicker is the resin layer, the smaller is the capacitance, and the crosstalk due to the capacitance can be reduced.

Second Embodiment

Figure 7:
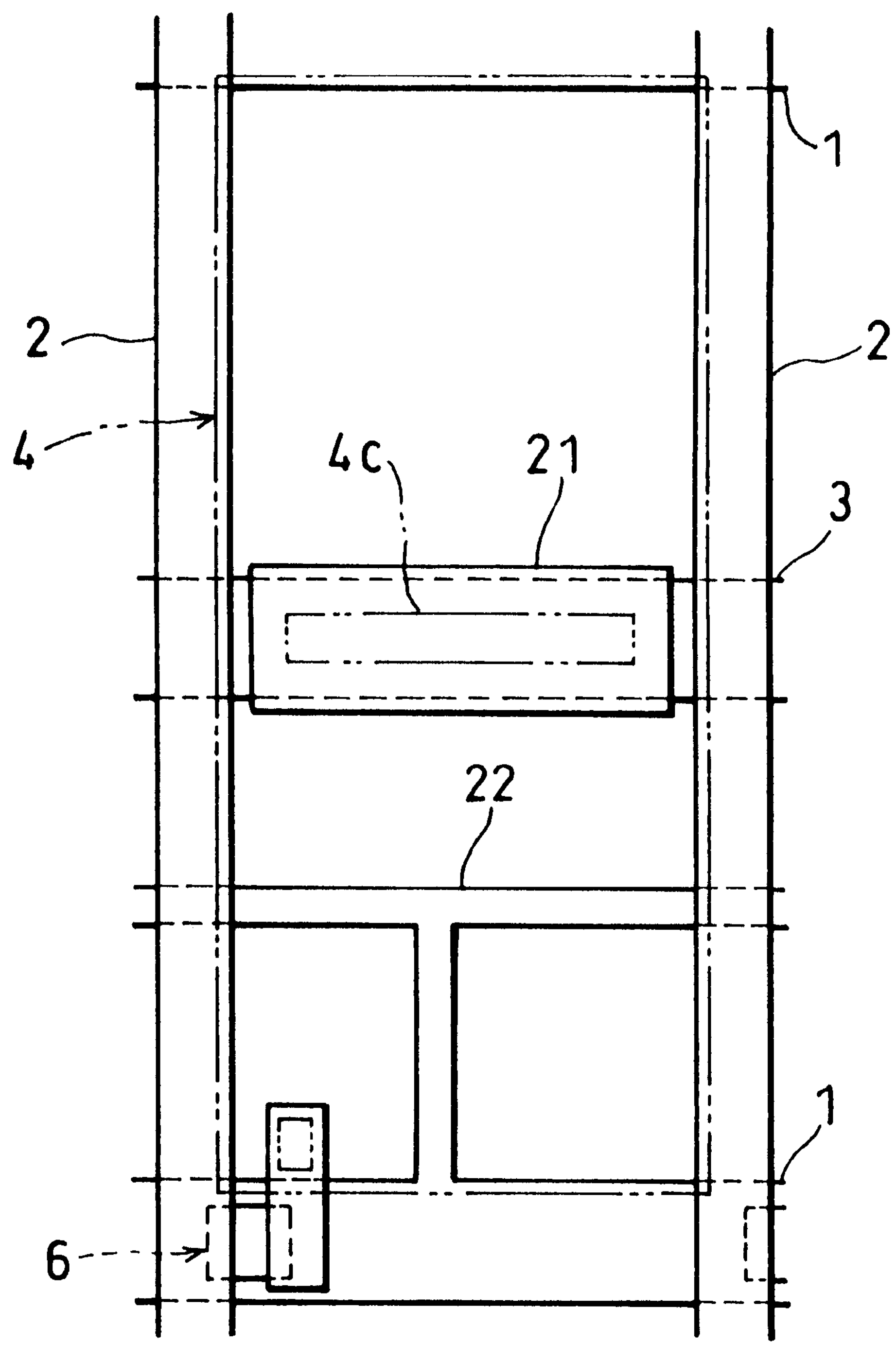
FIG. 7 is a plan view showing an arrangement of one pixel region of a wiring substrate for use in an active-matrix type liquid crystal display device in accordance with the second embodiment of the present invention.
Figure 8:
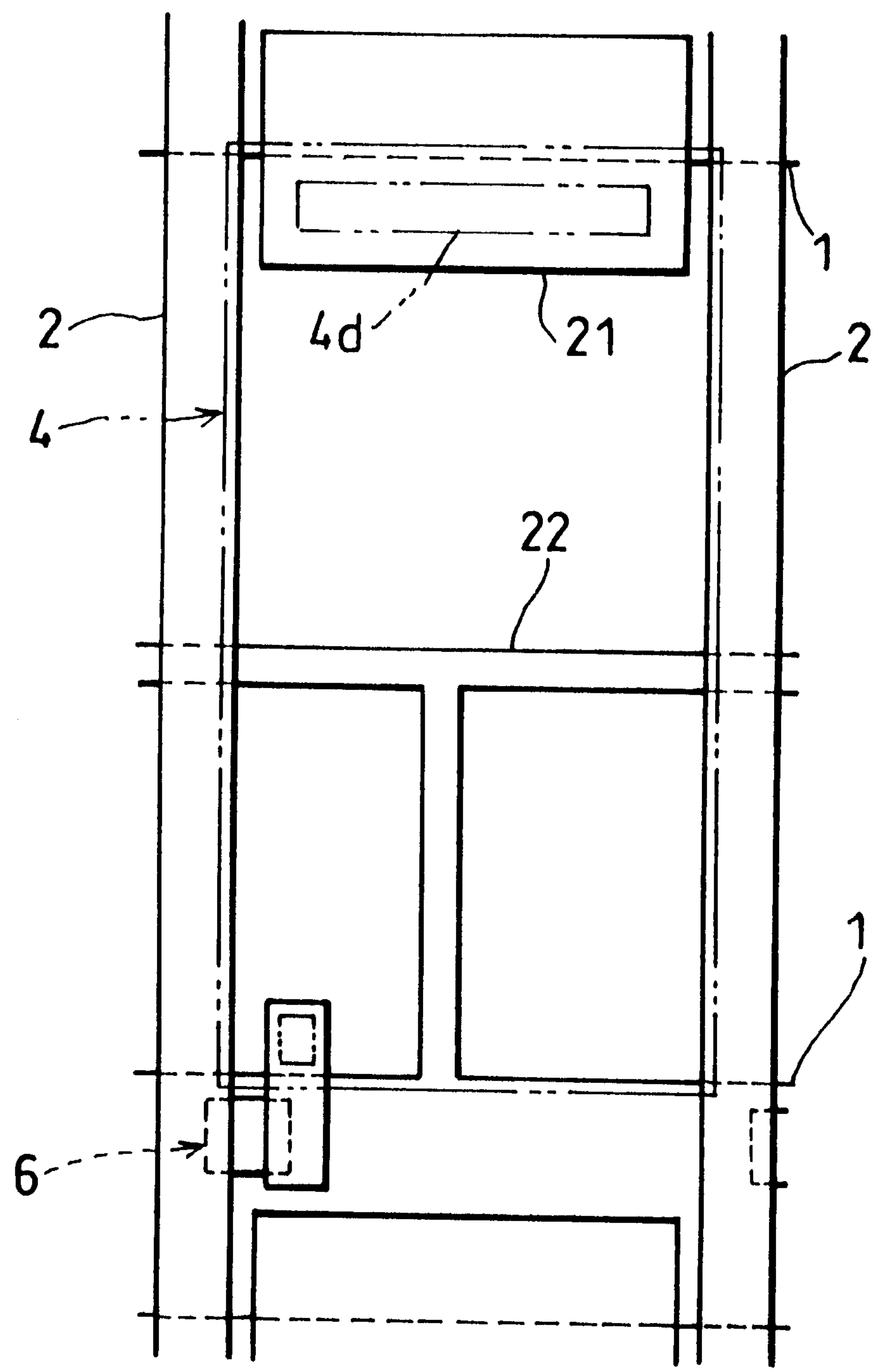
FIG. 8 is a plan view showing another arrangement of one pixel region of a wiring substrate for use in an active-matrix type liquid crystal display device in accordance with the second embodiment of the present invention.

The following descriptions will discuss the second embodiment of the present invention in reference to FIG. 7 and FIG. 8. Here, members having the same functions as those of the first embodiment will be designated by the same reference numerals, and thus the descriptions thereof shall be omitted here.

A liquid crystal display device in accordance with the present invention includes a wiring substrate respectively having a structure shown in FIG. 7 or FIG. 8. In both arrangements shown in FIG. 7 and FIG. 8, scanning lines 1, signal lines 2, Cs lines 3 and picture electrodes 4 are disposed in the same manner as the wiring substrate adopted in the first embodiment.

On the wiring substrate shown in FIG. 7, a Cs electrode 21 is deposited on the Cs lines 3 via a gate insulating film (not shown), to form an auxiliary capacitance of the Cs on Common structure. The Cs electrode 21 is in contact with the pixel electrode 4 at a contact portion 4*c*. In the wiring substrate of the present embodiment, auxiliary lines 22 are formed in replace of the auxiliary lines 5 (see FIG. 1) adopted in the first embodiment.

The auxiliary lines 22 are formed between the scanning line 1 formed at a lower portion of the pixel electrode 4 and the Cs line 3 so as to be parallel to the scanning line 1. Although not shown, the auxiliary lines 22 are connected to the scanning line 1 for each pixel electrode 4. As a result, the auxiliary lines 22 respectively make pair with the scanning lines 1. The auxiliary lines 22 are made the same metallic material as the scanning lines 1 with a constant width narrower than that of the scanning lines 1. The auxiliary lines 22 may be made of a transparent electrically conductive film such as indium tin oxide (ITO).

On the wiring substrate shown in FIG. 8, the Cs electrode 21 is formed on the scanning line 1 through the gate insulating film. As a result, the auxiliary capacitance of the Cs-on-Gate structure is formed. The Cs electrode 21 is in contact with the pixel electrode 4 at a contact portion 4*d*.

Both of the described wiring substrates are manufactured in the same manner as the wiring substrate adopted in the first embodiment except that the process of forming the auxiliary lines 5 in the first embodiment is replaced by the process of forming the auxiliary lines 22 together with the scanning lines 1 and the Cs lines 3.

In this process, an electrically conductive thin film made of, for example, Ta series metallic material is formed on the surface of the substrate. Then, by performing a patterning of the electrically conductive thin film, the scanning lines 1, the Cs lines 3 and the auxiliary lines 22 are formed. The described process may be formed by superimposing the transparent electrically conductive thin film such as ITO, etc., and the electrically conductive thin film on the substrate. Then, by performing a patterning of the electrically conductive thin film, the scanning lines 1 and the Cs lines 3 are formed. Thereafter, a patterning of the transparent electrically conductive thin film is performed to form the auxiliary lines 22.

The matrix display element in accordance with the present embodiment having the described arrangement offers the following advantageous characteristics:

(1) Even when a disconnection of the scanning line 1 occurs, an application of a voltage to the pixel electrode 4 can be ensured by the auxiliary lines 22, thereby preventing a generation of a line-shaped defect due to the disconnection;

(2) When a leakage occurs in a portion where the scanning line 1 and the signal line 2 are crossed, or a portion where the signal line 2 and the auxiliary line 22 are crossed, the scanning line 1 or the auxiliary line 5 is cut off on both sides of the crossing point by projecting thereto a laser beam, etc. As a result, a voltage will not be applied to the scanning line 1 or the auxiliary line 22 at the crossing point, thereby eliminating a generation of leakage;

(3) By arranging the auxiliary line 22 so as to have a narrower width than that of the scanning line 1, a reduction in the aperture ratio of a pixel can be suppressed. Moreover, by forming the auxiliary lines 22 by the transparent electrically conductive material such as ITO, the light transmitted through the pixel will not be blocked by the auxiliary lines 22, thereby preventing a reduction in the aperture ratio of the pixel; and (4) By adopting resin for the insulating film 12, the capacitance between the scanning lines 1 and the pixel electrode 4 and the capacitance between the auxiliary lines 22 and the pixel electrode 4 can be made smaller. Here, the smaller is the dielectric constant of the resin and the thicker is the resin layer, the smaller is the capacitance, and an amount of the pixel voltage that is pulled in by the capacitance can be reduced.

The pixel voltage is pulled in through the following mechanism: When a capacitance ($C_{gd}$) between the gate and the drain (pixel) increases, and afterward the gate is set ON so as to charge the pixel, and then the gate is set OFF. In this state, the drain potential is pulled-in to the gate through the capacitance ($C_{gd}$), and as a result, the potential of the pixel drops.

The electric potential thus pulled-in becomes a DC component to be applied to the liquid crystal sealed between the pixel electrode and the common electrode. As this DC component adversely affects the liquid crystal, the DC component is cancelled out by optimizing a voltage to be applied to the common electrode. However, when the $C_{gd}$ is large, variations in the capacitance $C_{gd}$ are likely to increase due to the variations in processing each pixel, and the DC component cannot be cancelled out completely in the liquid crystal panel, thereby reducing a reliability of the liquid crystal. In contrast, according to the wiring substrate of the present embodiment, as the capacitance $C_{gd}$ can be made smaller, a reliability of the liquid crystal can be improved.

Third Embodiment

Figures 10A, 10B:
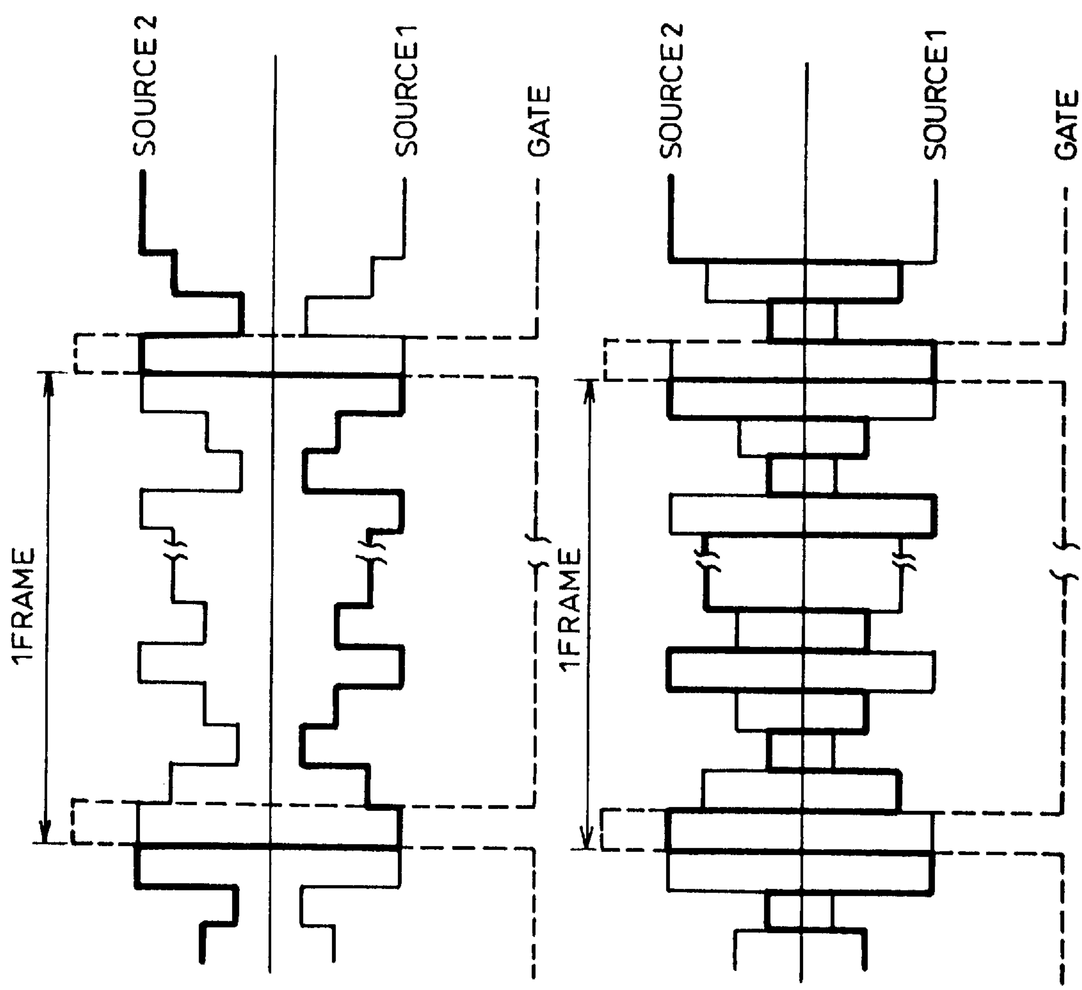
FIG. 10(*a*) and FIG. 10(*b*) are waveform diagrams showing waveforms of voltage respectively applied to signal lines and scanning lines when a source line inversion or a dot inversion occurs in the wiring substrate shown in FIG. 9.

The following descriptions will discuss the third embodiment of the present invention in reference to FIG. 9, FIG. 10(*a*) and FIG. 10(*b*).

As shown in FIG. 9, a liquid crystal display device in accordance with the present embodiment is provided with a wiring substrate whereon two adjoining auxiliary lines 31 and 32 are formed between adjoining signal lines 2. The auxiliary lines 31 and 32 are made of a transparent electrically conductive material such as a metallic material or ITO so as to have the same width, and are formed in parallel to the signal lines 2 under the pixel electrode 4. For each pixel electrode 4, the auxiliary line 31 is connected to a signal line 2 for applying a voltage to the pixel electrode 4 in a line. The auxiliary line 32 is connected to the signal line 2 for applying a voltage to the pixel electrode 4 of the adjacent line.

By the described arrangement of the auxiliary lines 31 and 32, three Cs electrodes 33 are formed on the Cs line 3 so as to avoid the auxiliary lines 31 and 32.

The manufacturing method of the described wiring substrate of the present embodiment differs from that of the first embodiment in its respective patterning processes for forming the auxiliary lines and the Cs electrode and a patterning process of the insulating layer for forming a contact hall.

Specifically, the wiring substrate of the present embodiment is arranged such that the capacitance between the pixel electrode 4 and the auxiliary line 31 is set equal to the capacitance between the pixel electrode 4 and the auxiliary line 32. When displaying in the liquid crystal display device provided with the described wiring substrate, a polarity of the voltage to be applied to the signal line 2 reverses at every line. For example, when carrying out a source line inversion, the waveform (sources 1 and 2) shown in FIG. 10(*a*) is applied to the two signal lines 2 which are adjacent to each other. On the other hand, when performing a dot inversion in which the line inversion and 1H inversion are combined, the waveform (sources 1 and 2) shown in FIG. 10(*b*) is applied to the signal lines 2 which are adjacent to each other.

For certain pixel electrode 4, supposed the capacitance of pixel, the capacitance between the pixel electrode 4 and the signal line 2 (auxiliary line 5), and the capacitance between the pixel electrode 4 and the next signal line 2 (auxiliary line 5) be respectively $C_{1C}$ (liquid crystal capacitance)+$C_{cs}$ (auxiliary capacity $C_{cs}$), $C_{sd1}$ and $C_{sd2}$, and respective changes in potential in the signal line 2 and the next signal line 2 be $V_{s1}$ and $V_{s2}$. Then, the effect on the pixel potential Vd by the capacitance $C_{sd}$ can be approximated by the following formula:

$$\Delta V_d = V_{s1} \times C_{sd1}/(C_{sd1}+C_{1c}+C_{cs}) + V_{s2} \times C_{sd2}/(C_{sd2}+C_{1c}+C_{cs}).$$

In the line inversion or the dot inversion, as the respective potentials $V_{s1}$l and $V_{s2}$ have opposite polarities (line sources 1 and 2 in FIG. 10(*a*) and FIG. 10(*b*)), $\Delta V_d$, a change in pixel potential, can be made smaller. Namely, as $C_{sd1}$ is equal to $C_{sd2}$, the above-mentioned formula can be rewritten as follows, and the $\Delta V_d$ can be most efficiently reduced.

$$\Delta V_d = (V_{s1}+V_{s2}) \times C_{sd}/(C_{sd}+C_{1c}+C_{cs}),$$

wherein $C_{sd1}$ (=$C_{sd2}$) is denoted by $C_{sd}$.

The described features of the present embodiment permits the effect from the capacitance to be reduced, thereby providing a liquid crystal display of high display quality by suppressing a generation of crosstalk. Here, the crosstalk suggests a crosstalk generated in the direction of the signal line 2.

Fourth Embodiment

Figure 11:
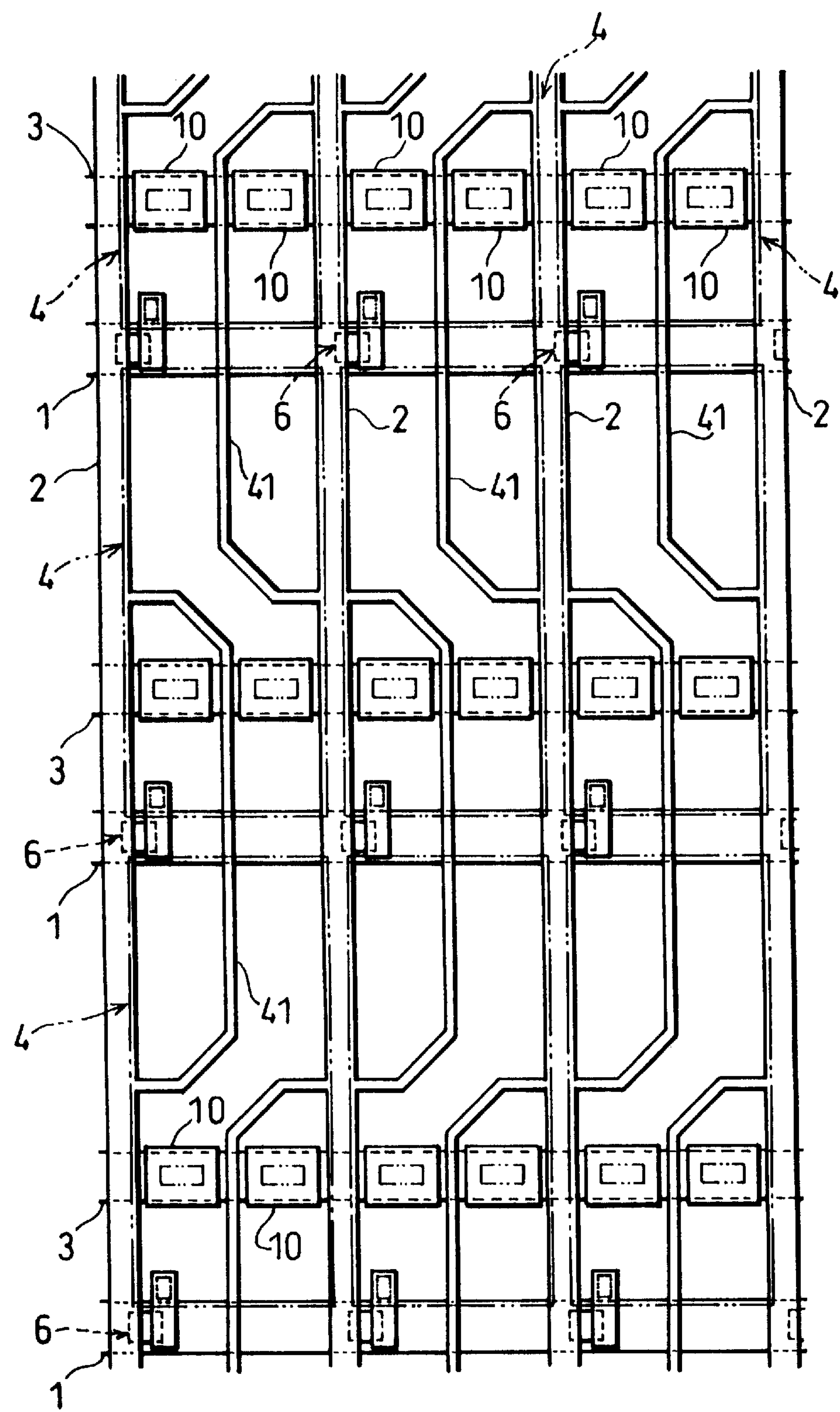
FIG. 11 is a plan view showing an arrangement of a wiring substrate for use in an active-matrix type liquid crystal display device in accordance with a fourth embodiment of the present invention.
Figure 12:
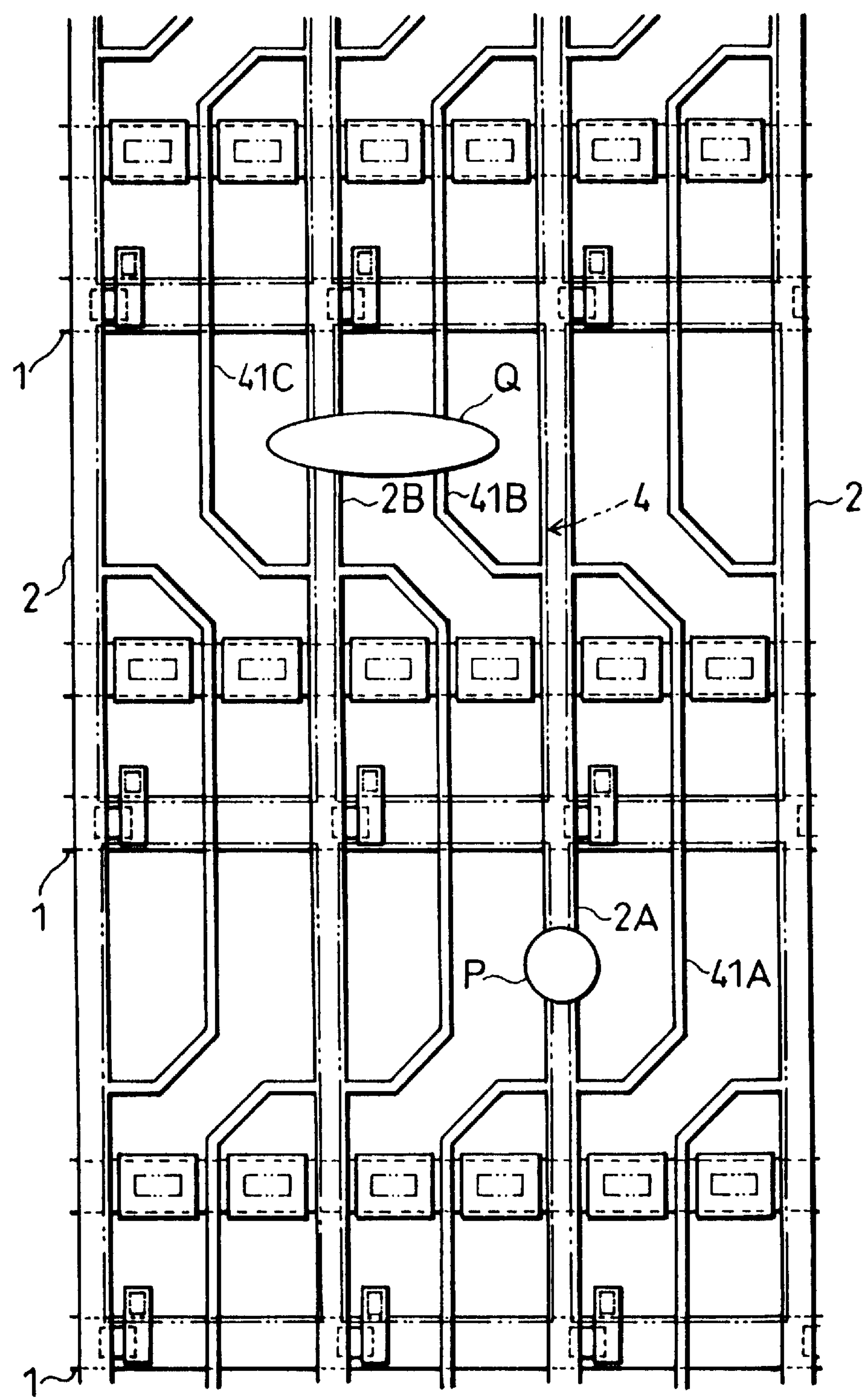
FIG. 12 is a plan view showing the state where a disconnection defect occurred in the wiring substrate of FIG. 11.
Figure 14:
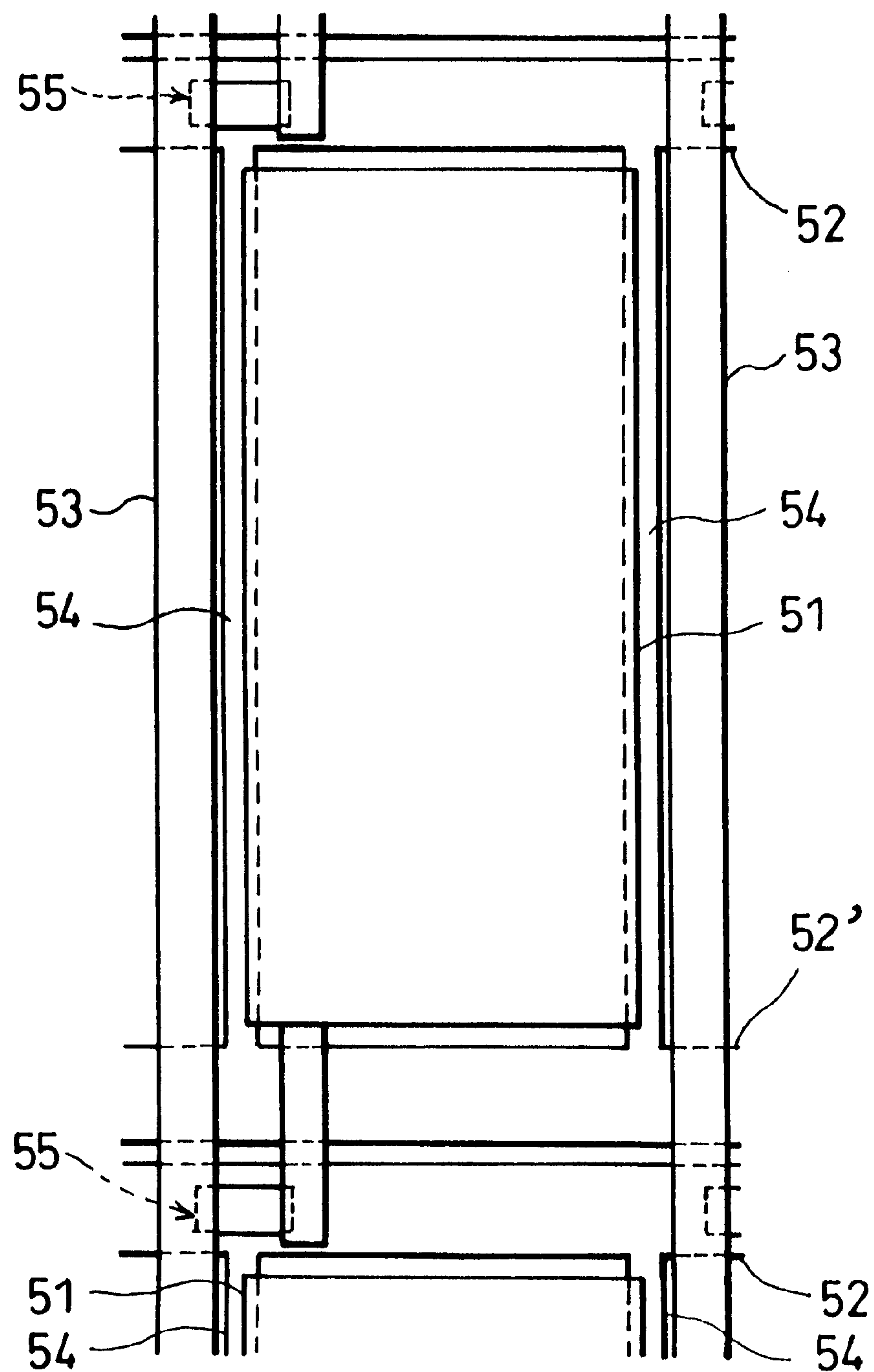
FIG. 14 is a plan view showing the arrangement of one pixel region of a conventional active-matrix type liquid crystal display device adopting a double scanning line.
Figure 15:
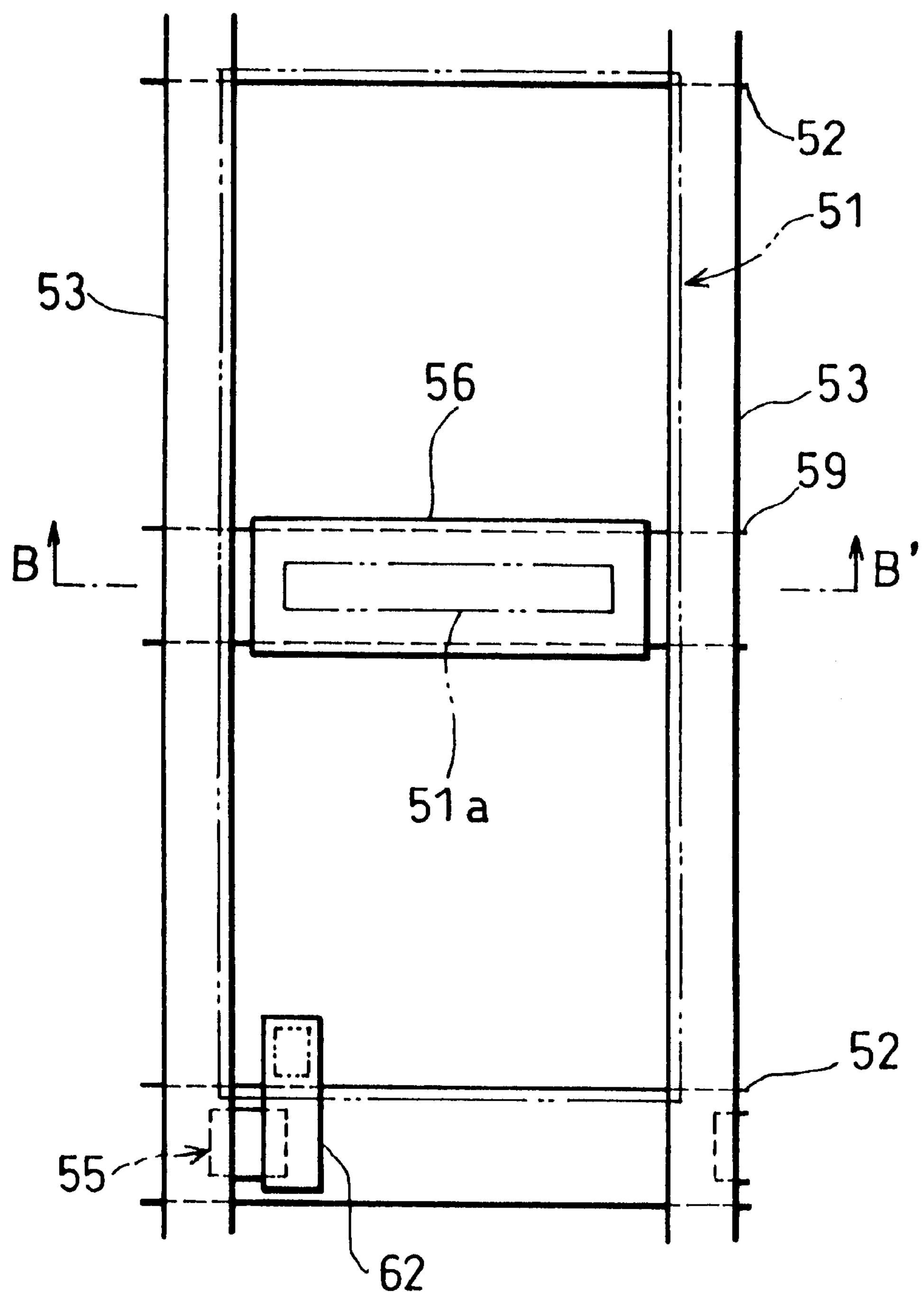
FIG. 15 is a plan view showing an arrangement of one pixel region of a wiring substrate for use in a conventional active-matrix type liquid crystal display device having an auxiliary capacitance of the Cs-on-Common structure.
Figure 16:
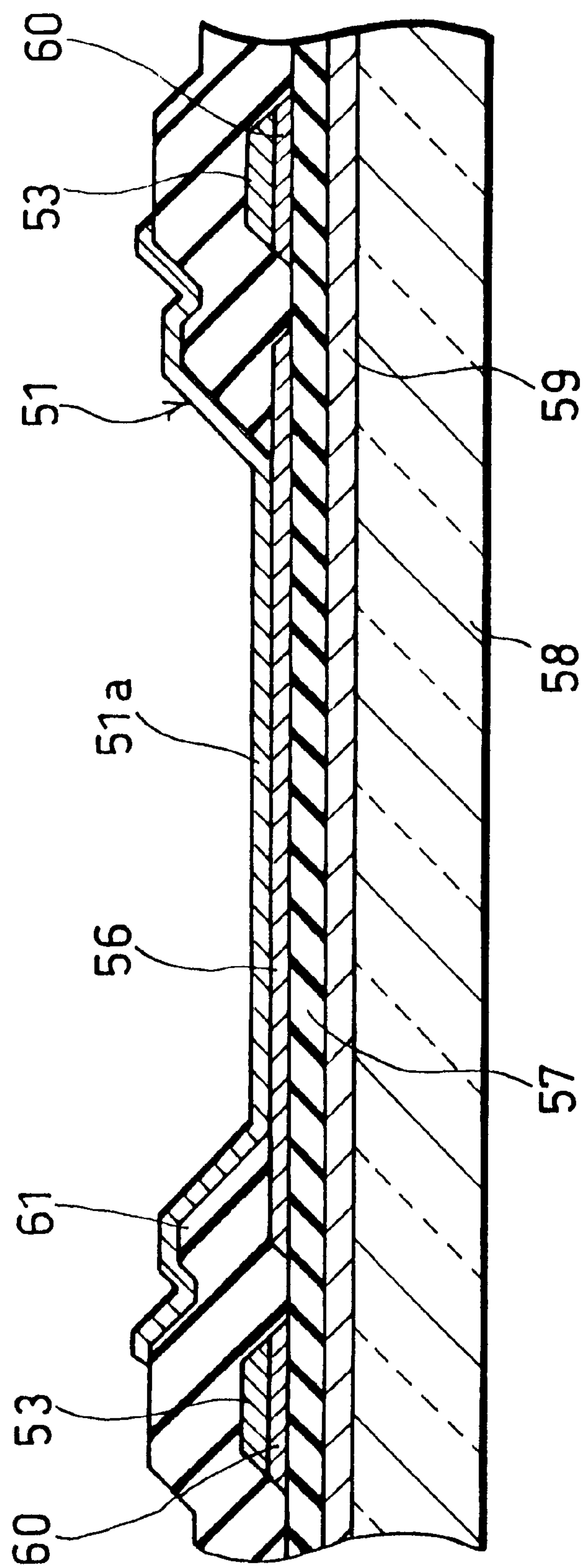
FIG. 16 is a cross-sectional view of the wiring substrate of FIG. 15 taken along lines B–B'.
Figure 17:
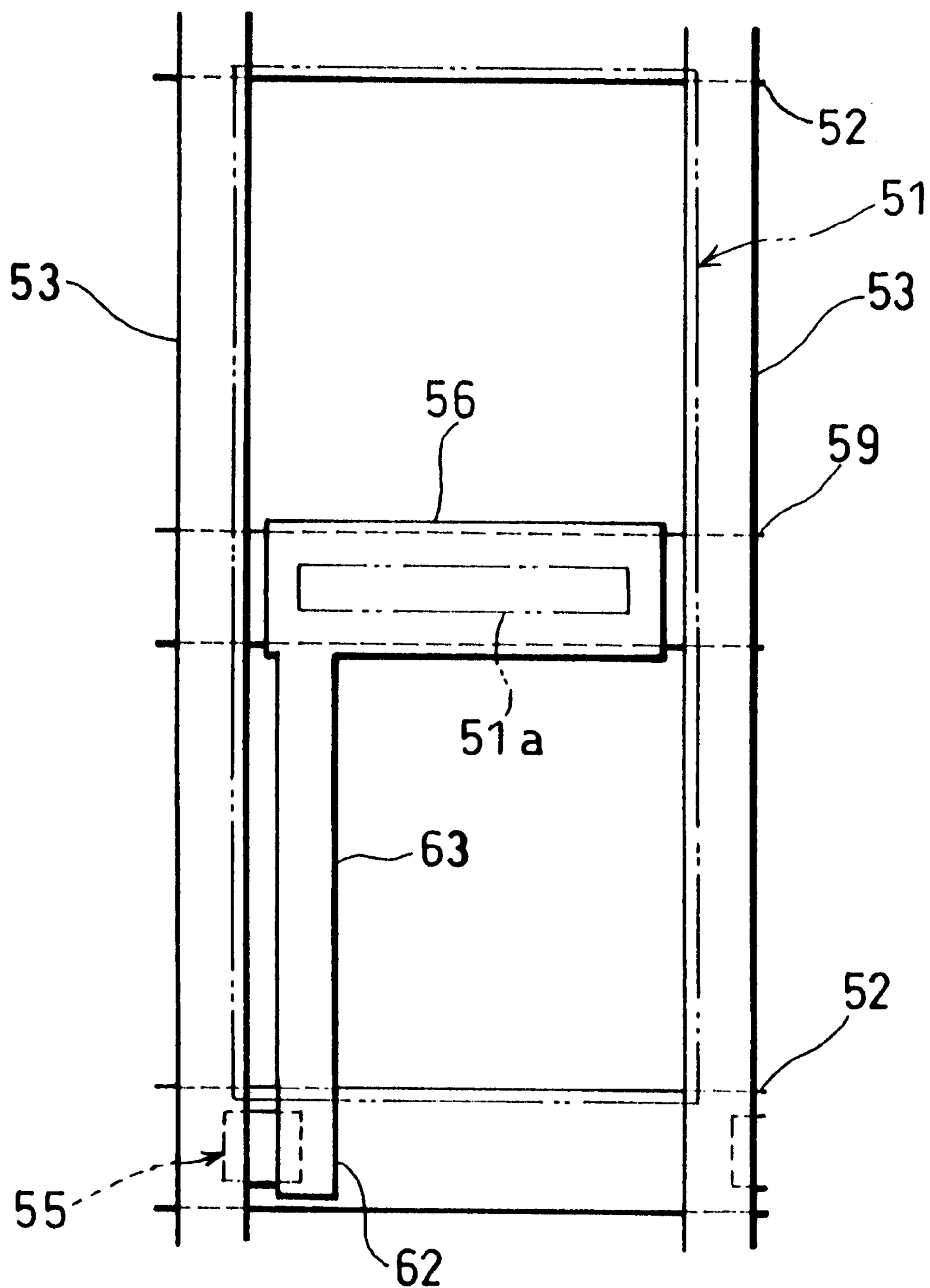
FIG. 17 is a plan view showing another arrangement of one pixel region of the conventional active-matrix type liquid crystal display device having an auxiliary capacitance of the Cs on Common structure.
Figure 18:
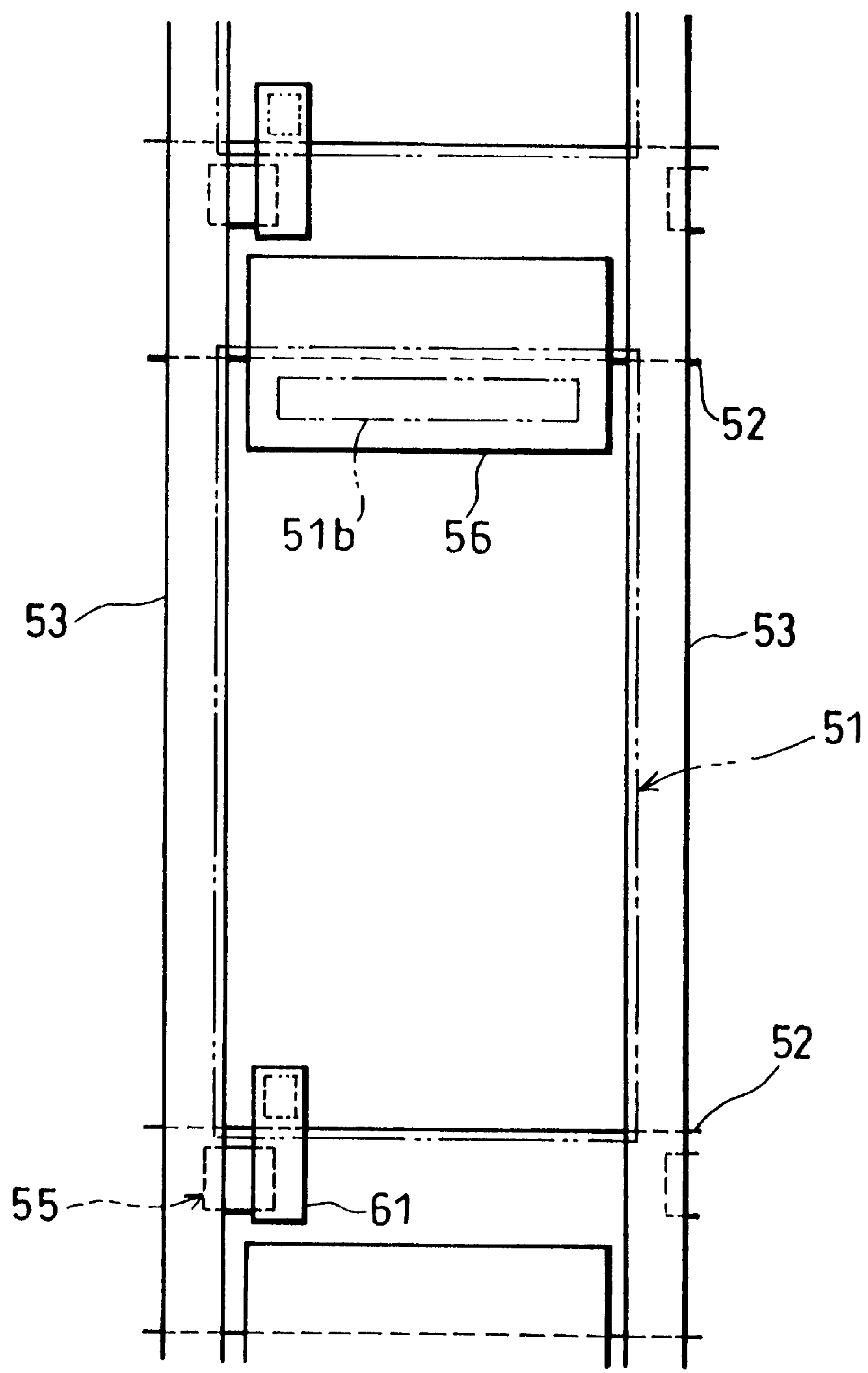
FIG. 18 is a plan view showing the arrangement of one pixel region of the conventional active-matrix type liquid crystal display device having an auxiliary capacitance of the Cs-on-Gate structure.
Figure 19:
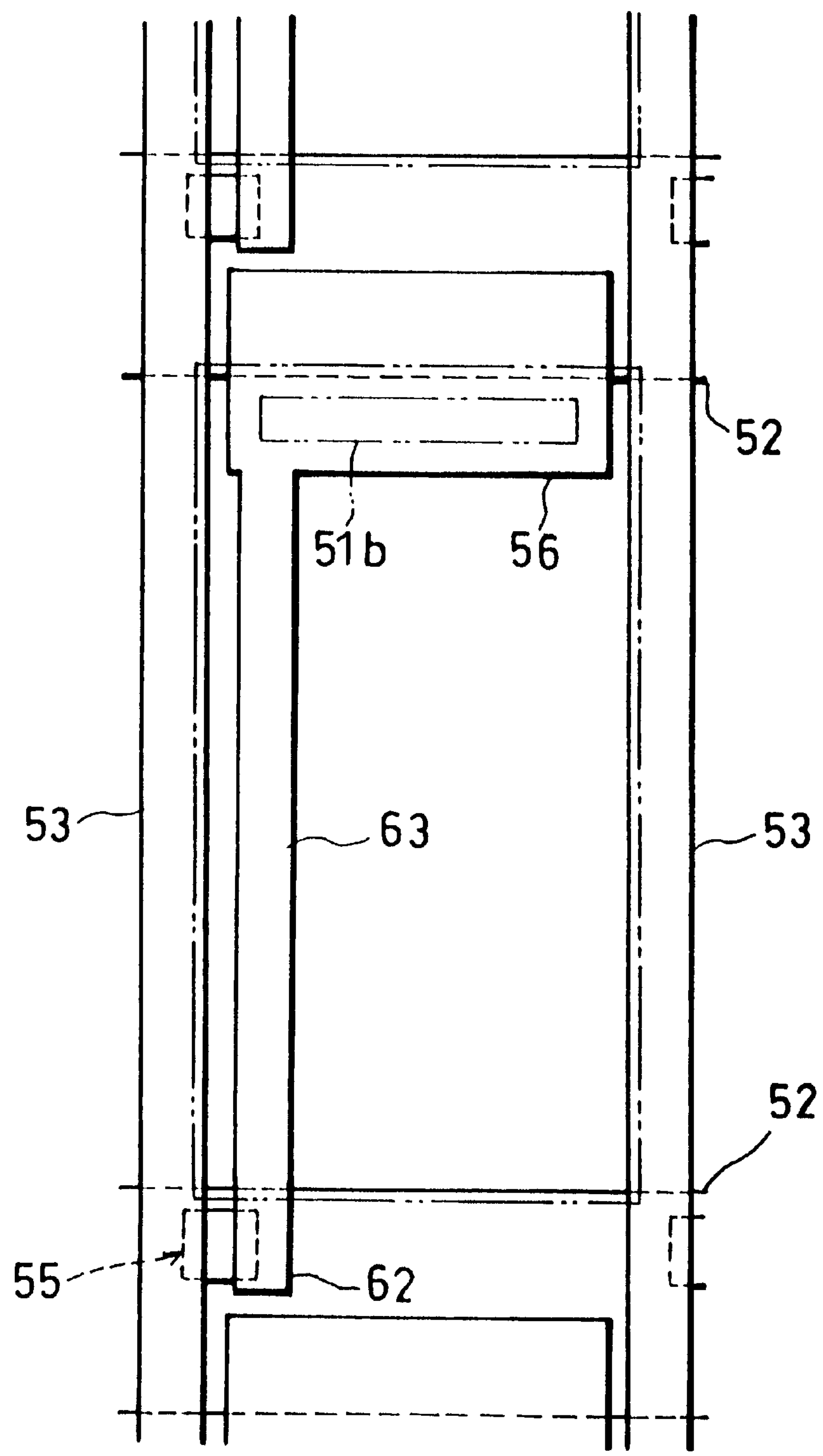
FIG. 19 is a plan view showing another arrangement of one pixel region of the wiring substrate of the conventional active matrix-type liquid crystal display having an auxiliary capacitance of the Cs-on-Gate structure.

The following descriptions will discuss the fourth embodiment of the present invention in reference to FIG. 11 through FIG. 13.

As shown in FIG. 11, a liquid crystal display device in accordance with the present embodiment has a wiring substrate whereon a plurality of auxiliary lines 41 are formed under pixel electrodes 4. Rr example, the auxiliary lines 41 are disposed in such a manner that portions connected to one signal line 2 or scanning line 1 are alternately formed between both sides of the signal line 2 or the scanning line 1. In other words, the auxiliary lines are disposed in such a manner that a plurality of the auxiliary lines 41 are connected to one signal line 2 or scanning line 1 on its opposite sides every one auxiliary line 41. Between the pixel electrodes 4 which are adjacent to each other along the scanning lines 1, one end of the two auxiliary lines 41 is connected to the signal line 2 at the closest position.

By the described arrangement of the auxiliary lines 41, for each pixel electrode 4, two Cs electrodes 10 are formed on the Cs line 3 so as to avoid the auxiliary lines 41.

As in the case of the third embodiment, the manufacturing method of the wiring substrate in accordance with the present embodiment differs from that of the first embodiment in respective patterning processes for forming the auxiliary lines and the Cs electrode and the patterning process of the insulating layer for forming a contact hall.

The wiring substrate of the present embodiment is arranged such the respective capacitances between the pixel electrode 4 and two auxiliary lines 41 formed under the pixel electrode 4 are equal. When displaying in the liquid crystal display device having the described wiring substrate, the polarity of the voltage to be applied to the signal line 2 reverses at every line as described earlier. As a result, the effects from the capacitance can be reduced, thereby providing a high quality liquid crystal display which hardly generates a crosstalk.

Furthermore, as the wiring substrate of the present embodiment is arranged such that the auxiliary lines 41 are dispersed along the signal line 2, a washing defect hardly occurs in the processes using some liquid such as wet etching, washing, etc., to be performed in the manufacturing process of the wiring substrate. Therefore, compared with the wiring substrate where the auxiliary lines 31 and 32 are formed successively along the signal line (see FIG. 9), the wiring substrate of an improved quality can be achieved.

Furthermore, the arrangement of the present invention offers advantageous characteristics over the arrangement of the third embodiment in that the number of the portions where the auxiliary lines 41 cross the scanning lines 1 and the Cs lines 3 can be reduced, thereby suppressing a generation of a leakage defect at the crossing point.

When a disconnection defect occurred in the wiring substrate, as shown in FIG. 12, a voltage is applied to the signal line 2.

For example, when the signal line 2 (2A) is disconnected at a disconnected portion P, the voltage is applied to the adjacent signal line 2A by making a circuit around the disconnected portion P through the auxiliary lines 41 (41A).

In the pixel electrode 4, when the signal line 2 (2B) and the auxiliary lines 41 (41B) connected to the adjacent signal line 2A are disconnected at a disconnected portion Q, the voltage takes the disconnected portion Q around by the auxiliary line 41 (41C) to be applied to the signal line 2B.

In the wiring substrate, when a leakage is generated, as shown in FIG. 13, the line-shaped defect is purposely disconnected using a laser beam to compensate for the leakage. In the present embodiment, a YAG (Yttrium-Aluminum-Garnet) laser with a laser power of from $10^{-9}$ to $10^{-6}$J/$\mu$m$^2$ is used in the state where the wiring substrate permits a lightening display.

Here, the lightening display permitting state indicates the state where a liquid crystal panel is assembled by laminating the wiring substrate and the counter substrate and sealing the liquid crystal therebetween. A signal of a simple waveform is applied to the scanning lines 1 and the signal line 2 of the described liquid crystal panel to observe the leakage between the scanning line 1 and the signal line 2.

For example, in the case where a leakage occurred in a crossing point R between the scanning line 1 and the signal line 2, the signal line 2 is cut off by projecting the laser beam on both sides (cut portions $R_1$ and $R_2$) of the scanning line 1.

Similarly, when a leakage defect occurred in a crossing point S between the signal line 2 and the Cs line 3, the signal line 2 is cut off by projecting a laser beam on both sides of the Cs line 3 (cut portions $S_1$ and $S_2$). Furthermore, when a leakage occurs at the crossing point T between the scanning line 1 and the auxiliary line 41, the auxiliary line 41 is cut off by projecting a laser beam on both sides of the scanning line 1 (cut portions $T_1$ and $T_2$).

In the described preferred embodiment, explanations have been given through the case where a wire is disconnected by projecting thereto a laser beam. However, the present invention is not limited to the method adopted in this preferred arrangement. For example, when a generation of a leakage in the wiring substrate is observed before being laminated to the counter substrate, the disconnection using the physical or chemical means other than the laser beam may be adopted to compensate for the leakage. The same can be said for compensation in the manufacturing process of the wiring substrate.

As described, by forming the auxiliary line 41, even if a disconnection defect occurs, the voltage can be kept applying to the signal line 2. Furthermore, even if a leakage defect occurs, it is permitted to purposely disconnect to eliminate the leakage defect. As described, even if the disconnection is made purposely, as the double-wire is provided, the voltage can be kept applying to the signal line 2 as in the case of the disconnection defect.

The described technique of compensating for the disconnection defect and the leakage defect can be also adopted to the respective wiring substrates adopted in the aforementioned preferred embodiments.

Furthermore, in the respective wiring substrates of the described preferred embodiments and the present embodiment, the TFT 6 of the reverse-stagger type is adopted. However, the present invention is also applicable to the case where the TFT of the stagger-type or MIM element is adopted as the switching element.

In the case where the TFT of the stagger type is adopted, the respective positions of gate and the semiconductor layer would differ from the case where the reverse-stagger type TFT is adopted.

In the case of adopting the MIM element, the scanning line 1 is omitted from the described wiring substrate, and the scanning line of the same width as that of the pixel electrode is formed on the counter substrate (color filter substrate) in replace of the described scanning line 1. Therefore, in this case, the present invention can be applied to the signal line formed together with the MIM element on the wiring substrate.

In this case, however, the pixel electrode is required to be formed on a different layer from the signal line via the insulating film as described in each of the preferred embodiments.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the instant contribution to the art and, therefore, such adaptations should and are intended to be comprehended within the meaning and range of equivalence of the appended claims.

What is claimed is:

1. An active-matrix type liquid crystal display device comprising:

a substrate;

pixel electrodes disposed in a matrix form on said substrate;

a plurality of scanning lines on said substrate for applying a scanning voltage to a switching element for each pixel electrode, said plurality of scanning lines are parallel to each other, aligned to pass between pairs of pixel electrodes and are in a separate layer from the pixel electrodes;

a plurality of signal lines for applying a signal voltage to each pixel electrode when the switching element is turned ON by the scanning voltage, said plurality of signal lines are parallel to each other, orthogonal to the scanning lines, aligned to pass between pixel electrodes, and are in a separate layer from the pixel electrodes;

auxiliary lines which short-circuit sections of each of said signal lines, and said auxiliary lines being formed in the layer including the signal lines, wherein each auxiliary line has a width narrower than a width of an adjacent one of said signal lines, and wherein each pixel electrode is disposed in a region bordered by adjacent scanning lines and adjacent signal lines, and one of said auxiliary lines applies the signal voltages to two adjacent pixel electrodes.

2. The active-matrix type liquid crystal display device as set forth in claim 1, wherein:

at least one of said auxiliary lines is connected to one of said signal lines at one point on one of said signal lines positioned a predetermined distance away from a crossing point between said signal line and said scanning line.

3. The active-matrix type liquid crystal display device as set forth in claim 1, wherein said auxiliary lines are continuously formed entirely along said signal lines which are short-circuited by said auxiliary lines.

4. The active-matrix type liquid crystal display device as set forth in claim 1, wherein:

each auxiliary line includes a root line extending substantially parallel to said signal lines, and a plurality of branched lines extending from said root line to said signal lines.

5. The active-matrix type liquid crystal display device as set forth in claim 1, wherein:

each auxiliary line is made of a transparent electrically conductive material.

6. The active-matrix type liquid crystal display device as set forth in claim 1, further comprising:

an organic insulating film formed under said pixel electrodes, said organic insulating film covering said signal lines.

7. The active matrix type liquid crystal display device as in claim 6, wherein said organic insulating film has a dielectric constant and a thickness, which reduces a crosstalk caused by a capacitance between pixels and said auxiliary lines.

8. The active matrix type liquid crystal display device as in claim 6, wherein said organic insulating film has a dielectric constant of 3.5.

9. The active matrix type liquid crystal display device as in claim 6, wherein said organic insulating film has a thickness of 3.0 $\mu$m.

10. A method of compensating for a defective pixel in an active-matrix type liquid crystal display device comprising:

a substrate;

pixel electrodes disposed in a matrix on said substrate;

a plurality of scanning lines on said substrate for applying a scanning voltage to each pixel electrode, said plurality of scanning lines are parallel to each other, aligned to be between pairs of pixel electrodes, and in a layer different from another layer including the pixel electrodes;

a plurality of signal lines for applying a signal voltage to each pixel electrode, said plurality of signal lines are in a same layer, parallel to each other, arranged between the pixel electrodes, and the plurality of signal lines intersect with said plurality of scanning lines;

auxiliary lines for short-circuiting sections of each of said signal lines, said auxiliary lines are in the same layer as the signal lines, wherein said sections each extend from one pixel electrode to an adjacent pixel electrode and, each of said sections includes a connection to one of the auxiliary lines, a connection to a switching element for applying the signal voltage to one of the pair of pixel electrodes, and a crossing point between one of said plurality signal lines and one of said plurality of scanning lines;

wherein each of said pixel electrodes is surrounded by adjacent scanning lines and adjacent signal lines;

the switching element switching ON and OFF an application of the signal voltage to one of the pixel electrodes, wherein the switching element is turned ON and OFF by the scanning voltage applied from the scanning lines to said switching element;

wherein the method comprises:

a. detecting a leakage voltage across the crossing point and cutting the voltage applied to opposite sides of the crossing point to prevent further leakage, and after a leakage leak at the crossing point between the one of said plurality of scanning lines and said length of signal lines, cutting said signal line on opposite sides of the crossing point to prevent further leakage, and b. forming each auxiliary line to have a width narrower than a width of an adjacent one of said signal lines.

* * * * *